United States Patent
Taub et al.

(10) Patent No.: US 8,290,769 B2
(45) Date of Patent: Oct. 16, 2012

(54) VOCAL AND INSTRUMENTAL AUDIO EFFECTS

(75) Inventors: Robert D. Taub, Princeton, NJ (US); J. Alexander Cabanilla, New York, NY (US); Jonathan Sheldrick, Woodside, NY (US); George Tourtellot, New York, NY (US)

(73) Assignee: MuseAmi, Inc., Princeton, NJ (US)

( * ) Notice: Subject to any disclaimer, the term of this patent is extended or adjusted under 35 U.S.C. 154(b) by 324 days.

(21) Appl. No.: 12/827,479

(22) Filed: Jun. 30, 2010

(65) Prior Publication Data

US 2011/0004467 A1 Jan. 6, 2011

Related U.S. Application Data

(60) Provisional application No. 61/221,900, filed on Jun. 30, 2009.

(51) Int. Cl.
*G10L 11/04* (2006.01)
(52) U.S. Cl. ............... 704/207; 84/609; 84/649; 84/386
(58) Field of Classification Search .................. 704/207; 84/609, 649, 386
See application file for complete search history.

(56) References Cited

U.S. PATENT DOCUMENTS

| | | | | |
|---|---|---|---|---|
| 4,354,418 A | * | 10/1982 | Moravec et al. | 84/454 |
| 4,429,609 A | * | 2/1984 | Warrender | 84/454 |
| 5,018,428 A | | 5/1991 | Uchiyama et al. | |
| 5,773,737 A | * | 6/1998 | Reyburn | 84/454 |
| 5,966,687 A | * | 10/1999 | Ojard | 704/207 |
| 6,046,395 A | * | 4/2000 | Gibson et al. | 84/603 |
| 6,087,578 A | * | 7/2000 | Kay | 84/626 |
| 6,245,984 B1 | * | 6/2001 | Aoki et al. | 84/611 |
| 6,629,067 B1 | * | 9/2003 | Saito et al. | 704/207 |
| 6,657,114 B2 | | 12/2003 | Iwamoto | |
| 7,309,827 B2 | * | 12/2007 | Sakurada | 84/616 |
| 8,168,877 B1 | * | 5/2012 | Rutledge et al. | 84/613 |
| 2008/0188967 A1 | | 8/2008 | Taub et al. | |

OTHER PUBLICATIONS

International Search Report dated Jun. 30, 2010 for International Application No. PCT/US2010/040673, 7 pages.

* cited by examiner

*Primary Examiner* — Jakieda Jackson
(74) *Attorney, Agent, or Firm* — Kilpatrick Townsend & Stockton LLP

(57) ABSTRACT

Systems, methods, and computer program products are provided for producing audio and/or visual effects according to a correlation between reference data and estimated note data derived from an input acoustic audio waveform. Some embodiments calculate a pitch score as a function of a pitch estimate derived from the input waveform, a reference pitch, and a real-time-adjustable pitch gating window. Other embodiments calculate the pitch score as a function of pitch and timing estimates derived from the input waveform, reference pitch and note timing data, an adjustable rhythm gating window, and an adjustable pitch gating window. The audio and/or visual effects are produced according to the pitch score, and may be used to generate outputs (e.g., in real time) for affecting a live performance, an audio mix, a video gaming environment, an educational feedback environment, etc.

58 Claims, 22 Drawing Sheets

VOCAL AND INSTRUMENTAL AUDIO EFFECTS

CROSS-REFERENCES

This is a non-provisional patent application of co-pending U.S. Provisional Application Ser. No. 61/221,900, filed on Jun. 30, 2009, titled "VOCAL AND INSTRUMENTAL AUDIO EFFECTS," which is hereby expressly incorporated by reference in its entirety for all purposes.

BACKGROUND

1. Field

Embodiments relate, in general, to audio processing, and, more particularly, to pitch and/or rhythm processing for vocal and/or instrumental audio inputs.

2. Related Art

Many software programs combine multiple input music tracks to provide a single output track. Using such software, it is possible to produce harmonized renditions. Some software can also support editing of the input music tracks to alter the input sound and thereby provide a different output, different from any of the input music tracks. Additional software is available to change the pitch of a vocalist's performance, thereby providing pitch correction for a singer.

Conventionally, applying pitch correction can be a difficult and tedious process. Typically, pitch correction is performed across an entire time span, or note-by-note. The pitch correction, in terms of target frequency, is selected by a user and must be manually applied and monitored. Acceptable results require application of pitch correction followed by review of results followed by additional pitch correction, and so forth until completion. A more time-efficient and flexible approach would be beneficial.

The user interface for providing control input and parameter adjustment via software can be clumsy and cumbersome. Easier techniques for receiving such input and adjustments would be beneficial.

SUMMARY

Among other things, systems and methods are provided for producing audio and/or visual effects according to a correlation between reference data and estimated note data derived from an input acoustic audio waveform.

In one set of embodiments, a system is provided for processing an audio performance. The system includes an audio processing subsystem configured to: calculate a pitch estimate and a current time estimate as a function of the input audio waveform; calculate a temporal window around the current time estimate as a function of a temporal window size; correlate the temporal window to a portion of a reference track stored in a data store of the computer system and having a number of reference notes, each reference note having a reference pitch and a reference note duration; identify a candidate reference note from the reference notes, such that the candidate reference note has a reference note duration that overlaps at least partially with the temporal window; and calculate a pitch score as a function of the pitch estimate and the reference pitch of the candidate reference note. The system further includes an output processing subsystem, communicatively coupled with the audio processing system, and configured to produce an audiovisual effect according to the pitch score.

In another set of embodiments, a computer-implemented method is provided for processing an audio performance. The method includes: calculating a pitch estimate and a current time estimate as a function of an input audio waveform using a processor of the computer system, the input audio waveform received at a computer system from an acoustic audio source; calculating a temporal window around the current time estimate as a function of a temporal window size using the processor; correlating the temporal window using the processor to a portion of a reference track stored in a data store of the computer system and having a number of reference notes, each reference note having a reference pitch and a reference note duration; identifying a candidate reference note from the reference notes using the processor, such that the candidate reference note has a reference note duration that overlaps at least partially with the temporal window; calculating a pitch score as a function of the pitch estimate and the reference pitch of the candidate reference note using the processor; and producing an audiovisual effect according to the pitch score.

In still another set of embodiments, a system is provided for processing an audio performance. The system includes an audio processing system and an output processing subsystem. The audio processing subsystem is configured to: receive an input audio waveform; calculate a pitch estimate as a function of the input audio waveform; receive an adjustment to a pitch window size substantially concurrently with receiving the input audio waveform, the pitch window size defining extents of a pitch window from a first pitch location below a pitch window anchor to a second pitch location above the pitch window anchor; correlate the pitch window anchor to a reference pitch corresponding to a candidate reference note, the candidate reference note being one of a plurality of reference notes of a reference track; and calculate a pitch score as a function of the pitch estimate and the reference pitch of the candidate reference note. The output processing subsystem is communicatively coupled with the audio processing system and is configured to produce an audiovisual effect according to the pitch score and the pitch window.

In yet another set of embodiments, a computer-implemented method is provided for processing an audio performance. The method includes: receiving an input audio waveform; calculating a pitch estimate as a function of the input audio waveform; receiving an adjustment to a pitch window size substantially concurrently with receiving the input audio waveform, the pitch window size defining extents of a pitch window from a first pitch location below a pitch window anchor to a second pitch location above the pitch window anchor; correlating the pitch window anchor to a reference pitch corresponding to a candidate reference note, the candidate reference note being one of a plurality of reference notes of a reference track; calculating a pitch score as a function of the pitch estimate and the reference pitch of the candidate reference note; and producing an audiovisual effect according to the pitch score and the pitch window.

Other features and advantages of the present invention will be apparent to one of ordinary skill in the art upon review of the detailed description of the present invention and the included figures.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Many environments exist in which it is desirable to analyze an acoustic audio input (e.g., an analog, live vocal, or instrumental track) with reference to a pitch and/or rhythm goal. For example, pitch and/or rhythm information is extracted from the analog audio input waveform and compared against reference data to generate a numeric score, which may indicate how "good" the input audio performance is with respect to the reference as a baseline. The numeric score can then be used to produce an audio and/or visual effect, depending on the environment.

Some embodiments calculate a pitch score as a function of a pitch estimate derived from the input waveform, a reference pitch, and a real-time-adjustable pitch gating window. Other embodiments calculate the pitch score as a function of pitch and timing estimates derived from the input waveform, reference pitch and note timing data, an adjustable rhythm gating window, and an adjustable pitch gating window. Still other embodiments generate additional types of scores based on the input waveform, including, for example, rhythm scores, vibrato scores, tonality scores, etc. Audio and/or visual effects are produced according to one or more of the scores, and may be used to generate outputs (e.g., in real time) for affecting a live performance, an audio mix, a video gaming environment, an educational feedback environment, etc.

Figure 1:
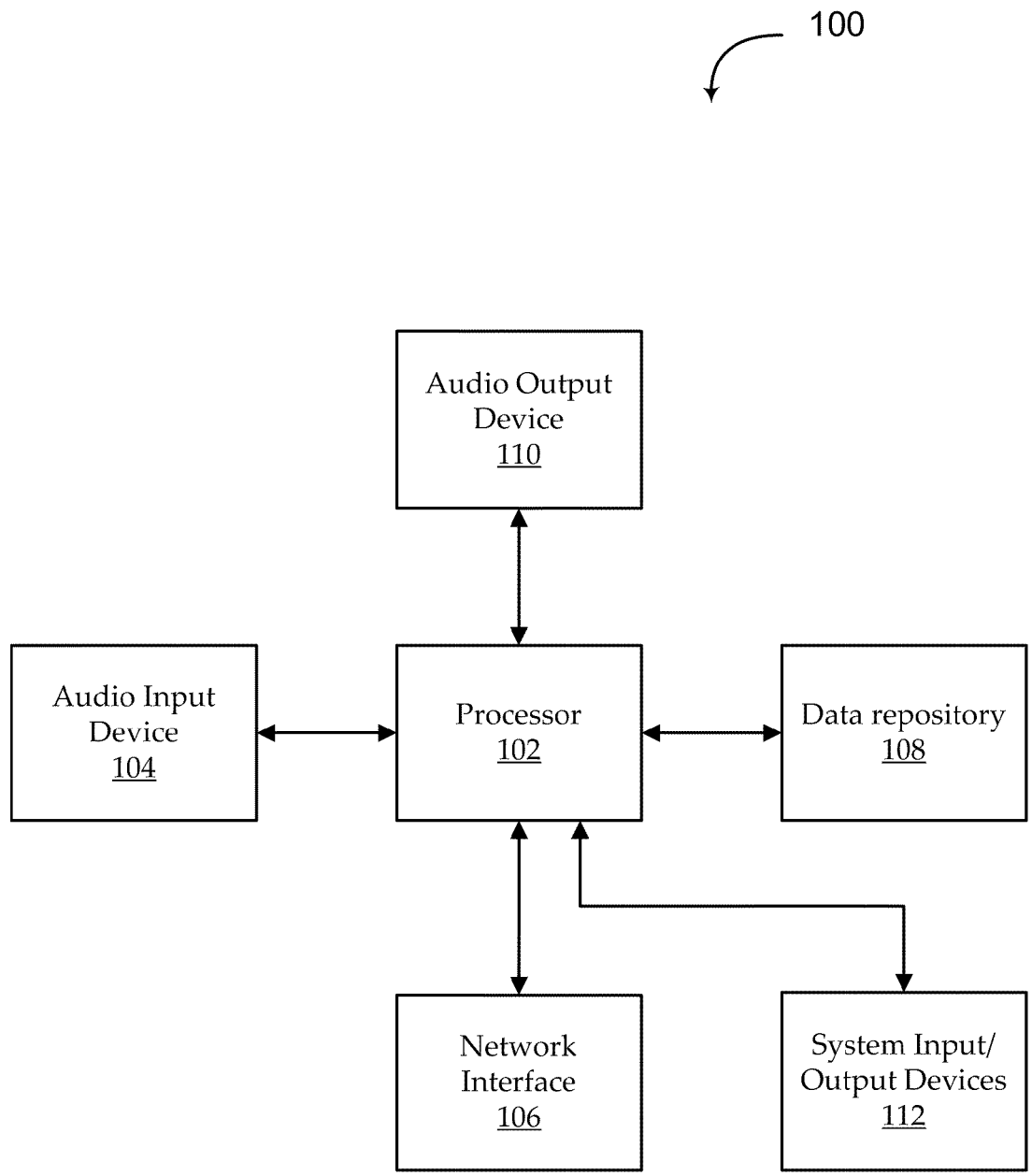
FIG. 1 shows a high-level, simplified block diagram of a system that applies correction to an input vocal and/or instrumental performance and can receive parameters for operation of the system through a user interface.

Turning first to FIG. 1, a high-level, simplified block diagram is shown of a system 100 that applies correction to an input vocal and/or instrumental performance and can receive parameters for operation of the system through a user interface. The system 100 receives the input vocal and/or instrumental performance and parameters, and provides them to a processor 102 that performs the correction, input processing, and output processing for producing output audio. The processor can receive audio input, such as a live vocal and/or instrumental performance, from an audio input device 104 such as a microphone or from a network interface 106 or from a data repository 108. The processor performs pitch correction and input processing as described further below.

The processor 102 can produce output, such as a corrected vocal and/or instrumental performance, to an audio output device 110 such as loudspeakers, or as a data file to the network interface 106 or to the data repository 108. System input/output devices 112 can include keyboards, display devices, trackpads, touchpads, and the like through which the system can provide a user interface and receive inputs and provide outputs. The processor 102 may be integrated with the audio input device 104, network interface 106, data repository 108, audio output device 110, and system input/ output devices 112, or these components may be provided separately and independently of the processor.

It will be appreciated that many implementations of the system 100 are possible. In some embodiments, the system 100 is implemented as a dedicated device. The dedicated device may include one or more internal microphones, configured to sense acoustic pressure and convert it into an audio input signal for use by the system 100. Alternately, the dedicated device may include one or more audio input ports for interfacing with external microphones, media devices, data stores, or other audio sources. In certain of these embodiments, the dedicated device may be a handheld or portable device. In other embodiments, the system 100 may be implemented in a multi-purpose or general purpose computing device (e.g., as software modules stored on a computer-readable medium for execution by a computer). In certain of these embodiments, the audio input may be received from a sound card, external microphone, or stored audio file. The audio input signal is then generated and provided to the processor 102.

In one embodiment, the system 100 provides vocal harmonization effects through correction of an input performance according to a selectable rhythmic displacement from a target performance. That is, the selectable rhythmic displacement defines a time span or error tolerance window within which an input performance will be corrected. The input performance and corrected performance can comprise a vocal performance or instrumental performance or a combination of the two. The target performance can comprise a vocal performance or instrumental performance or a combination of the two.

With the displacement time span, the system determines the correct location (time) within the target performance to which the input performance will be synchronized. The point of synchronization in the target performance can be adjusted in real time as the input performance is received. As described further below, an input performance that leads or lags the target performance can be corrected for time alignment with the target performance within the selected rhythmic displacement and can be pitch corrected according to the time-aligned target performance. The tolerance window of the rhythmic displacement can be adjusted spontaneously by the user and in real time. That is, a user can select one level of tolerance for one part of a song, and then manually and/or automatically adjust to a different level of tolerance for a different part of the song without stopping the playback of the song.

The resulting corrected performance more closely resembles the target performance. The system can adjust the input performance to more closely align with the target performance in time and can also adjust the input performance to more closely align with the target performance in pitch. As noted above, the input performance (and corrected performance) and the target performance can be vocal, instrumental, or both. The correction can be across types, as well, such as where the input performance is vocal and the target performance is instrumental, or vice versa. The system can also be used to generate multiple audio tracks, which can be layered on top of each other for a chorus or harmonization effect.

Generating multiple audio tracks from a single live input performance and combining them for harmony effects can be controlled and adjusted through a convenient user interface. Processing parameters such as the amount of rhythmic displacement, gain applied to harmony tracks, pitch of harmony tracks, echo and reverb effects, and the like can be applied in real time for contemporaneous review of adjustments and effects. The user interface permits convenient input of parameters such as tap interval on a tap input device for defining the time interval for the echo effect and all additional audio effects. This simplifies the input process.

Figure 2:
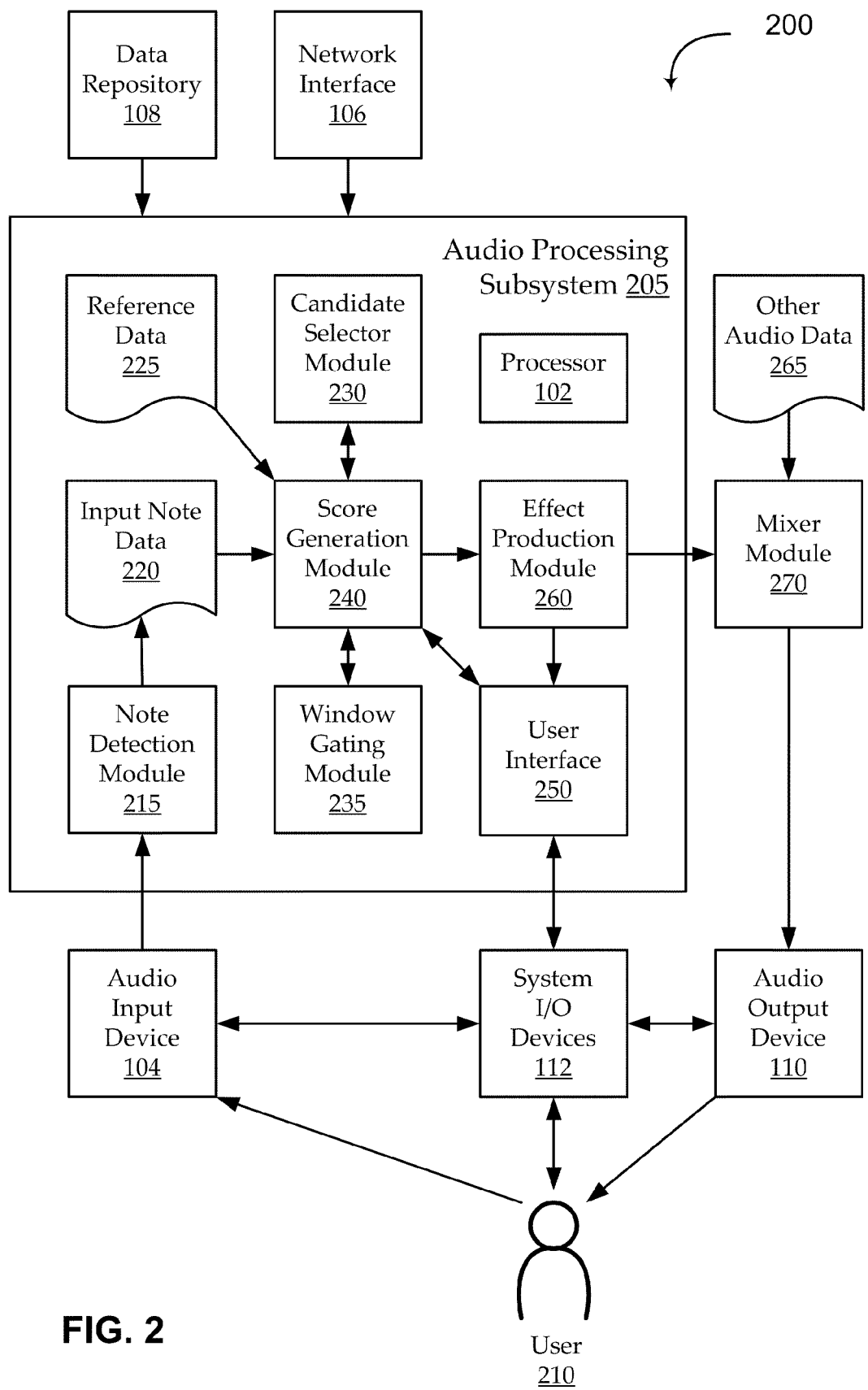
FIG. 2 shows a more detailed block diagram of an illustrative system for processing an audio performance and producing an output effect, according to various embodiments.

FIG. 2 shows a more detailed block diagram of an illustrative system 200 for processing an audio performance and producing an output effect, according to various embodiments. As with the system 100 of FIG. 1, the system 200 includes a processor 102, an audio input device 104, a network interface 106, a data repository 108, an audio output device 110, and system input/output devices 112. The system 200 also includes an audio processing subsystem 205 that includes a number of modules.

Modules of the audio processing subsystem 205 may be implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers. For example, in some embodiments, some or all of the modules are implemented as (or include) separate hardware components. In other embodiments, some or all of the modules are implemented as controllers, or otherwise as components, of the processor 102. In still other embodiments, some or all of the modules are computer program products that cause the processor 102 to implement certain functionality. In other embodiments, some or all of the modules are implemented as computer programs comprising instructions executed by the processor that implement certain functionality.

The processor 102 may include an intelligent hardware device, e.g., a central processing unit (CPU) such as those made by Intel® Corporation or AMD®, a microcontroller, an application specific integrated circuit (ASIC), etc. The processor 102 may include other components that are desirable or necessary for implementing functionality described herein, such as a specialized audio processor, vocal encoder, transcoder, etc.

Embodiments of the data repository 108 may include random access memory (RAM) and/or read-only memory (ROM). The data repository 108 may store computer-readable, computer-executable software code containing instructions that are configured to, when executed, cause the processor 102 to perform various functions described herein (e.g., functions of the modules of the audio processing subsystem 205). Alternatively, the software may not be directly executable by the processor 102 but is configured to cause the system 200, e.g., when compiled and executed, to perform the functions. The data repository 108 may store data representing target performances and input performances.

As illustrated, a user 210 interacts with the system 200 via the system input/output (I/O) devices 112. The system I/O devices 112 may include any type of standard or specialized interfaces or controllers, including, for example, keyboards, mouses, displays, printers, and the like. The system I/O devices 112 may also include one or more interfaces for other devices or systems. For example, the system I/O devices 112 may include USB ports, Firewire ports, Bluetooth transceivers, musical instrumental digital interface (MIDI) ports, phone jacks, RCA jacks, Ethernet ports, etc.

The user 210 may, for example, interact with a user interface 250 (e.g., a graphical user interface (GUI)) of the audio processing subsystem 205 through the system I/O devices 112. The user interface 250 may provide access to some or all of the functionality provided by the audio processing subsystem 205. Various elements of illustrative user interfaces 250 are shown in FIGS. 10-23, some of which are described in more detail below. While the illustrative user interfaces 250 are shown in the context of a software-implemented digital audio workstation (DAW), many other interface environments are possible. For example, the user interface 250 may be part of a video gaming environment, an educational software environment, a rack-mounted hardware system, etc. Further, while the illustrative user interfaces 250 are shown as software-implemented controls and displays, inputs may be received via physical controls (e.g., knobs, buttons, sliders, etc.), and outputs may be communicated to other systems through wired or wireless links (e.g., not directly displayed to the user by the user interface 250 of the audio processing subsystem 205).

According to various embodiments, the user 210 interacts directly, or indirectly (e.g., via the system I/O devices 112 and/or via the user interface 250) with one or more audio input devices 104 and/or audio output devices 110. The audio input device 104 may include any type of device capable of receiving audio input. It may be assumed, for the sake of typical embodiments, that the audio input represents a type of performance that varies by certain amounts in rhythm and/or pitch (e.g., is "off" by certain amounts) from a target reference performance.

For example, the audio input may represent a live, analog musical performance. The audio input may be a live vocal or instrumental performance being captured by a microphone (i.e., as the audio input device 104). Notably, the audio input may originate from a recording (e.g., a pre-recorded performance retrieved from a digital or analog storage medium), and may or may not, in fact be analog when received by the system 200. For example, the audio input may be received as a digital file that, while not technically analog, still represents sub-scale-tone variations in pitch (e.g., variations in frequency that are smaller than the smallest pitch intervals represented in a reference track) and/or sub-meter variations in rhythm (e.g., note onsets and/or note offsets that indicate variations in temporal locations smaller than the smallest rhythmic intervals represented in a reference track). The audio input may also be configured to represent variations in envelope (e.g., amplitude), timbre, vibrato (e.g., depth, frequency, quality, etc.), etc.

The audio input may be received as an input audio waveform (e.g., digital or analog) by the audio processing subsystem 205. While the system 200 is illustrated with the input audio waveform being received by the note detection module 215 from the audio input device 104, the input audio waveform may, in fact, be received from other systems or devices. For example, a recorded performance may be received from the data repository 108, from the Internet or another system or network via the network interface 106, etc. Embodiments of the audio processing subsystem 205 receive the input audio waveform at a note detection module 215. The note detection module 215 is configured to generate one or more types of input note data 220 according to the input audio waveform. For example, the note detection module 215 generates estimates of pitch, rhythm, envelope, timbre, vibrato, etc. as input note data 220.

Various techniques may be used to generate the input note data 220, depending, for example, on the type of input audio waveform being received. Data may be extracted, parsed, calculated, etc. In some embodiments, some or all of the input note data 220 is deconstructed from the input audio waveform. Some techniques for deconstructing an input audio waveform to generate input note data 220 are described in U.S. patent application Ser. No. 12/024,981 filed Feb. 1, 2008 entitled "Music Transcription" to R. Taub et al., assigned to the assignee of the present application, which is incorporated herein by reference for any and all purposes. For the sake of non-limiting illustration, the description herein focuses on generation of a pitch estimate and a timing estimate as the input note data 220 generated by the note detection module 215. It will be appreciated that similar or identical techniques could be applied to other types of input note data 220 without departing from the scope of embodiments.

It is worth noting that, in some embodiments, one or more other inputs are received through the same or other audio input devices 104 (e.g., or other system I/O devices 112). For example, it may be desirable in certain contexts to receive live rhythmic information (e.g., a dynamic or baseline tempo reference) via a tap pad or similar device. Similarly, harmonic, rhythmic, audio-effect-related, and/or other types of input may be received from MIDI controllers (e.g., keyboards, breath controllers, etc.), computer systems, musical instruments, etc. These and/or other inputs may be received as input audio for the generation of input note data 220, or they may be received as reference data 225, as described below.

The input note data 220 generated by the note detection module 215 may be compared against one or more types of reference data 225. While the reference data 225 may be received in a number of ways (e.g., as described above), embodiments may typically receive reference data 225 from the data repository 108. The reference data 225 may include a set of reference notes, for example, as a reference track. The reference notes may be associated with pitch information (e.g., a particular scale degree, an absolute scale tone, a frequency, etc.), timing information (e.g., a note duration, a meter indication, a note onset, a note offset, etc.), etc.

One exemplary category of reference track is representative of a song. The song may be characterized by a set of notes in sequence, each note having associated pitch and timing information. The song may be further characterized by multiple voices, harmonies, changes in volume, changes in tempo, key signature, time signature, and/or any other useful musical element. As such, the reference data 225 includes a reference track that indicates some or all of the song information. For example, the reference track is the sequence of notes of the song, each note indicating the corresponding pitch, timing, volume, etc.

Another exemplary category of reference track is representative of a music framework. The music framework may indicate standard intervals in pitch and/or rhythm. For example, a music framework includes a set of tones that makes up one or more scales (e.g., or mode, raga, etc.), which may or may not be ordered. Another music framework includes a set of note duration values ranging from thirty-second notes to whole notes, including dotted and double-dotted variants.

Embodiments of the audio processing subsystem 205 generate a score as a function of the input note data 220 and the reference data 225 using a score generation module 240. For example, the note detection module 215 calculates (e.g., deconstructs, extracts, etc.) a pitch estimate and a current time estimate as a function of the input audio waveform. The pitch estimate is an estimate of the pitch represented by the input audio waveform at a current performance or playback time represented by the current time estimate. Notably, the pitch estimate may represent an apparent pitch detected over a time duration (e.g., some number of samples or some time window), a particular pitch in a polyphonic performance (e.g., a pitch having the strongest amplitude or a particular frequency composition), etc.

The score generation module 240 receives the pitch estimate and the current time estimate as input note data 220 from the note detection module 215, and the score generation module 240 receives comparable reference data 225 (e.g., reference pitch and reference timing data) from the data repository 108 or some other source. The score generation module 240 then calculates a score that indicates, for example, how far "off" the input note data 220 is from the reference data 225 in one or more parameters. In one embodiment, the score is a number having a value that corresponds to a magnitude of difference between the input note data 220 and the reference data 225.

In one example, suppose that a singer is singing a song for which reference data 225 is available to the audio processing subsystem 205 (e.g., the singer is singing a capella or along with a reference track from the reference data 225 that corresponds to the song). At some given location in the song, the reference data 225 indicates an "A" (e.g., at 880 Hz). The note detection module 215 calculates input note data 220 from the input audio waveform estimating that the singer is, instead, singing at 871 Hz (i.e., the singer is flat at that point in the performance as compared to the reference data). The score generation module 240 may generate a pitch score to indicate that the singer is flat and/or by how much. For example, the pitch score may indicate a difference of nine Hertz, a difference of roughly negative one percent, a difference according to a logarithmic scale, an improvement with respect to previous performances by the same or other singers, etc. The magnitude of the pitch score may or may not directly correspond to the comparison. For example, the score may be "negative nine" to indicate that the singer is nine Hertz flat in comparison to the reference, the score may be "Good" or "Blue" to indicate that the singer is close to the correct pitch (but not exactly on pitch), etc.

Notably, the score may be generated to account for or to discount certain musical qualities of the performance. For example, a singer may sing in an octave that is different from the octave of the reference data 225. It may or may not be desirable to discount the octave difference when generating the score. In one embodiment, the score generation module 240 generates a candidate pitch score as a function of a candidate pitch set that includes a pitch estimate from the input note data 220 and a reference pitch from the reference data 225. The score generation module 240 shifts the pitch (e.g., adjusts the frequency or a pitch parameter) of the pitch estimate or the reference pitch by one or more octave multiples to generate one or more adjusted pitch sets. One or more adjusted pitch scores are generated by the score generation module 240 as a function of the one or more adjusted pitch sets, and the score generation module 240 determines whether the adjusted pitch scores represent an improvement over the candidate pitch score. For example, one of the adjusted pitch scores may indicate a closer correlation between the pitch estimate and the reference pitch than does the candidate pitch score, which may further indicate that the performer is in a different octave. In that event, the adjusted pitch score may be used as the pitch score, thereby discounting the performance being in a different octave from the reference data 225.

In other embodiments, it may be desirable for the pitch score to reflect the difference in octave or to provide the user 210 with some other indication of the difference in octave (e.g., via the user interface 250). Further, in certain embodiments, it may be possible to correct for intervals other than an octave. For example, when a performer is performing a capella (or even with an instrument), the entire performance may be shifted by some amount, and it may be desirable to evaluate the performance relative to itself rather than relative to some absolute key dictated by the reference data 225. As such, the note detection module 215 and/or the score generation module 240 may deconstruct some key (e.g., or baseline pitches, sets of intervals, etc.) against which to construct the pitch score.

The same or other techniques may be used with different types of scores. In one embodiment, the note detection module 215 calculates a note onset estimate as a function of the input audio waveform. The note onset may be a location (e.g., time, number of samples, etc.) at which a note event starts or appears to start (e.g., a certain magnitude and speed of change in amplitude, etc.). The score generation module 240 then calculates a rhythm score as a function of the note onset estimate and a reference note onset from the reference data 225.

In another embodiment, the note detection module 215 calculates a note offset estimate as a function of the input audio waveform. The note offset may be a location at which a note event ends or appears to end (e.g., a certain magnitude and speed of change in amplitude, etc.). The score generation module 240 then calculates a rhythm score as a function of the note offset estimate and a reference note offset from the reference data 225.

In still another embodiment, the note detection module 215 calculates a note duration estimate as a function of the input audio waveform. The note duration may be a duration of the note (e.g., time, number of samples, rhythmic value, number of clicks or rhythmic intervals, etc.), determined as an absolute or relative duration (e.g., between the note onset and note offset). The score generation module 240 then calculates a rhythm score as a function of the note duration estimate and a reference note duration from the reference data 225.

In yet another embodiment, the note detection module 215 calculates a note amplitude estimate as a function of the input audio waveform. The note amplitude may be an amplitude at a particular time (e.g., the current time estimate) or may indicate a certain amplitude envelope or trend. For example, the note amplitude estimate indicates a particular type of note attack or decay, an apparent crescendo or decrescendo, etc. The score generation module 240 then calculates an energy score as a function of the note amplitude estimate and a reference note amplitude from the reference data 225.

In even another embodiment, the note detection module 215 calculates a note clarity estimate as a function of the input audio waveform. The note clarity may relate to a tone quality, timbre (e.g., frequency composition), etc. of a note event or a particular point in time. For example, the vocal quality of the performer may be raspy, inconsistent (e.g., in pitch or timbre), pure, affected, etc. The score generation module 240 then calculates a clarity score as a function of the note clarity estimate and a reference note clarity from the reference data 225.

The reference note clarity may or may not relate to a particular note in a reference track. For example, depending on the type of instrument used to generate the performance, a reference track may indicate that a particular note should be performed in a growl, in falsetto, using a certain embouchure, using a type of mute or stop, etc. In another example, reference data 225 may indicate overall quality characteristics that are used in the clarity score generation, such as a purity of tone or closeness to a predetermined paradigmatic timbre from a particular instrument or instrument type.

In another embodiment, the note detection module 215 calculates a note vibrato estimate as a function of the input audio waveform. The note vibrato may include various parameters, such as a vibrato depth (e.g., a pitch range over which the vibrato extends), a vibrato frequency (e.g., a speed of the vibrato), a vibrato quality (e.g., how consistent the vibrato is in depth, frequency, and/or symmetry), etc. The score generation module 240 then calculates a vibrato score as a function of one or more parameters of the note vibrato estimate and a reference note vibrato from the reference data 225. As with the clarity score (e.g., and/or any of the other scores), the vibrato score may or may not relate to a particular note in a reference track. For example, other factors being equal, a more consistent vibrato may correspond to a higher vibrato score, regardless of reference data 225.

Embodiments of the score generation module 240 provide other functionality, as well. In some embodiments, the score generation module 240 uses window gating as at least one factor in score generation, as implemented by a window gating module 235. Embodiments of the window gating module 235 can use window gating to compare any type of input note data 220. As used herein, "window gating" refers to a technique by which a window (e.g., tolerance band, etc.) is used to gate a response. For the sake of illustration, window gating will be described only in reference to pitch window gating and rhythm window gating.

Pitch window gating is implemented according to a pitch window generated by the window gating module 235. The pitch window may indicate a pitch range around the pitch estimate from the input note data 220 and/or around the reference pitch from the reference data 225. For example, the pitch range may be symmetric or asymmetric about the pitch estimate or pitch reference (e.g., each of the pitch ranges above and below may range from zero to some number, and may or may not be equal to each other). Further, the pitch range may be defined in any useful way, such as by a number of scale tones (e.g., a decimal number), a number of "cents" (e.g., where one-hundred cents is equivalent to a half-step interval), a number of Hertz, a percentage of a reference note's pitch value, etc.

In some embodiments, the pitch window can be set (e.g., adjusted) by the user 210 via the user interface 250. For example, the pitch window may be dynamically adjusted or a program may be preset using a number of user interface 250 controls (e.g., sliders, etc.). In other embodiments, the pitch window can be set by an external system, according to reference data 225 or other data stored in the data repository 108, etc. In still other embodiments, the window gating module 235 can analyze changes in a live or recorded input performance, or in the reference data 225 (e.g., forward-looking or trend data) to dynamically adjust the pitch window. In various embodiments, including any of these or other embodiments, the pitch window may be adjusted in real time as the input audio waveform is being received.

The pitch window may then be used by the window gating module 235 to affect parameters of or through the score generation module 240. For example, one use of a pitch score generated by the score generation module 240 may be to pitch shift an output waveform, as described more fully below. Pitch window gating may be used to gate the pitch shifting. For example, if the performance is too far from a corresponding reference note of the reference data 225, it may be undesirable to pitch shift the input audio waveform (e.g., the effect may be too artificial sounding), or it may be desirable to shift the pitch in a different way (e.g., by sliding to the note, etc.). Similarly, one or more pitch windows may be used to affect the pitch score. For example, the pitch score may be one value or set of values within the pitch window, and a different value or set of values outside the pitch window. Further, some embodiments may use multiple pitch windows of different sizes for various functionality.

Rhythm window gating is implemented according to a temporal window generated by the window gating module 235. The temporal window may indicate a time duration around the current time estimate from the input note data 220, which may be symmetric or asymmetric about the current time estimate (e.g., the time duration represented by the portions of the temporal window ahead of and behind the current time estimate may each range from zero to some number, and may or may not be equal). Further, the temporal window may be defined in any useful way, such as by a number of rhythmic intervals (e.g., eighth notes), a number of clicks at a certain metronome speed, a number of samples, a percentage of a rhythm unit defined by a time signature, a number of seconds, etc.

As with the pitch window, embodiments of the temporal window can be set (e.g., adjusted) by the user 210 via the user interface 250, dynamically adjusted or preset according to a program using a number of user interface 250 controls, set by an external system (e.g., according to reference data 225 or other data stored in the data repository 108, etc.), etc. In certain embodiments, the window gating module 235 can analyze changes in a live or recorded input performance, or in the reference data 225 (e.g., forward-looking or trend data), to dynamically adjust the temporal window. For example, as the frequency of note events increases (e.g., as notes become shorter and more dense), the temporal window may dynamically shrink). In various embodiments, including any of these or other embodiments, the temporal window may be adjusted in real time as the input audio waveform is being received.

The temporal window may then be used by the window gating module 235 to affect parameters of or through the score generation module 240. For example, certain functionality of the audio processing subsystem 205 is described as using a reference note from reference data 225, and the temporal window may be used to determine an appropriate reference note to use (e.g., referred to herein as a "candidate reference note"). In one embodiment, the window gating module 235 calculates a temporal window around the current time estimate as a function of a temporal window size. The temporal window may be correlated to a portion of the reference track (e.g., a playback location in the reference track corresponding to the performance location in the song) to find a candidate reference note to use for score generation by the score generation module 240. The score generation module 240 may then calculate a pitch score as a function of the pitch estimate and the reference pitch of the candidate reference note.

In some embodiments, the candidate reference note is identified by a candidate selector module 230 (e.g., in communication with the score generation module 240). Embodiments of the candidate selector module 230 identify a candidate reference note from the plurality of reference notes of the reference data 225, such that the candidate reference note has a reference note duration that overlaps at least partially with the temporal window. For example, the temporal window may effectively be a moving comparison by which to determine which reference note in the reference data 225 to use for comparison to the input note data (e.g., for score generation).

It is worth noting that, in some cases, multiple reference notes may fall within the temporal window, but it may still be desirable for the candidate selector module 230 to select a single note for score generation. In some embodiments, the candidate selector module 230 determines whether one of the overlapping reference notes overlaps to the largest extent. In other embodiments, the candidate selector module 230 analyzes each overlapping reference note to determine which has a reference pitch that is closer to the pitch estimate than the reference pitches of the others of the overlapping reference notes. The candidate selector module 230 then selects that winning reference note as the candidate reference note for use in score generation.

Having generated one or more scores using embodiments of the score generation module 240, the score or scores may be used to produce one or more audiovisual effects. As used herein, "audiovisual effects" include any audio effects, video effects, audio and video effects, and/or effects that cause a secondary audiovisual effect (e.g., a change to a parameter or setting that affects other audio and/or visual effects, an output of stored data later used to generate an audio and/or visual effect, etc.). As illustrated, the audiovisual effects are generated, according to the one or more scores, by an effect production module 260. In some embodiments, the audiovisual effects are produced substantially in real time with receiving the input audio waveform at the audio processing subsystem 205.

As described above, in some embodiments, the produced audiovisual effect includes pitch shifting of some or all of the input audio waveform. In one embodiment, an output audio waveform is generated (e.g., by the effect production module 260) by pitch shifting the input audio waveform as a function of a pitch score (generated by the score generation module 240), the pitch score indicating a magnitude of pitch distance between the pitch estimate and the reference pitch of the candidate reference note. The audiovisual effect may then be produced by the effect production module 260 by outputting the output audio waveform. For example, outputting the output audio waveform may involve outputting the output audio waveform to an audio data storage system (e.g., the data repository 108 or some other local or remote storage), to an audio playback system (e.g., including the audio output device 110), etc.

In another embodiment, the pitch shifting only occurs when pitch window gating is satisfied. For example, the window gating module 235 calculates a pitch window around the pitch estimate as a function of a pitch window size (e.g., dynamically controllable by the user 210). The score generation module 240 then calculates a pitch score as a function of the pitch estimate and the reference pitch of the candidate reference note and determines whether the reference pitch falls within the pitch window. The effect production module 260 may then generate an output audio waveform by pitch shifting the input audio waveform as a function of the reference pitch only when the reference pitch falls within the pitch window.

It will be appreciated that many other types of audiovisual effects may be produced. One such other type of audiovisual effects may include the effect production module 260 generating a harmony event as a function of the pitch score. In one embodiment, the harmony event includes playing (or increasing the volume of, etc.) one or more harmony notes or voices present in the reference data 225. For example, the reference data 225 may indicate one or more possible harmony notes that can be played if the performer is "on" with respect to pitch, rhythm, energy, clarity, etc. In another embodiment, the harmony event includes automatically generating a harmony note to harmonize "live" with the input audio waveform according to certain parameters, such as a preselected key signature, genre, artist, etc.

Notably, the audiovisual effect may depend at least in part on the environment in which the audio processing subsystem 205 is being employed. In one embodiment, the input audio waveform is received from the user 210 as part of an interaction with an educational interface environment. For example, a singing trainer may "listen" to a trainee user's 210 performance and use an embodiment of the score generation module 240 and an embodiments of the effect production module 260 to provide various types of educational feedback, including scoring the user's 210 progress, generating real-time audiovisual feedback, affecting lesson plans, etc.

In another embodiment, the input audio waveform is received from the user 210 as part of an interaction with a video game environment. For example, a video game may simulate a live performance venue in which the user 210 is performing, or the video game may provide any type of environment in which a performance score can affect game play. Embodiments of the score generation module 240 and the effect production module 260 may then generate one or more scores and produce an audiovisual effect according to the scores by affecting game play for the user during the user's interaction (e.g., the same or another interaction) with the video game environment.

Notably, there may be many different ways to affect game play according to the performance scores. For example, the game play may be affected by adjusting a user 210 score in the video game environment according to the performance score (e.g., where the two scores are directly corresponding, functionality related, indicative of each other, etc.), adjusting a difficulty level of game play in the video game environment according to the performance score (e.g., as a performance continues to correlate strongly with the reference performance, the difficulty level may continue to increase), adjusting an audiovisual aesthetic element of the video game environment according to the pitch score (e.g., characters, scenery, colors, scene elements, icons, etc. may change), adjusting an audio playback parameter according to the pitch score (e.g., a lead vocal track may increase in volume, harmony events may occur, etc.), and/or by producing any other type of effect relating to game play.

It will be appreciated that different types of audiovisual effects may be used in different ways, for example, as described above. In some embodiments, some or all of the audiovisual effects are output to (e.g., affect the look and feel of) the user interface 250. In other embodiments, some or all of the audiovisual effects are output to the data repository 108 or some other temporary or semi-permanent storage location. In still other embodiments, some or all of the audiovisual effects are output to one or more system I/O devices 112 and/or to the network interface 106 for use by other systems or devices.

In yet other embodiments, some or all of the audiovisual effects are output to one or more audio output devices 110. Of course, outputting to an audio output device 110 may include further processing to generate and/or affect output audio data (e.g., an output audio waveform). In certain embodiments, some or all of the audiovisual effects are output to a mixer module 270 (e.g., an N-channel mixer), which may add or adjust one or more additional audio effects (e.g., reverb, wet/dry ratio, etc.), mix the output with other audio data 265 (e.g., another audio track, etc.), etc. In some embodiments, generating output audio data includes preserving, reintroducing, and/or otherwise introducing various artifacts of the input performance from the input audio waveform. For example, an output audio waveform may be generated in a way that preserves the timber, quality, vibrato, and/or other artifacts of the user's 210 performance.

For the sake of illustration, embodiments of the system 200 are used, in one or more environments, to implement pitch shifting and related functionality, referred to as a "Harmonizer Effect." The Harmonizer Effect refers to a combination of a corrected vocal and/or instrumental performance and one or more copies of the corrected vocal and/or instrumental performance. For example, the Harmonizer Effect generates an audio signal that includes a pitch-corrected version of an input vocal signal (the input audio waveform), mixed with a harmonization of the pitch-corrected vocal input. Several controls affect how the melody and harmony pitches are determined and how the melody and harmony voices are manipulated and combined. Some or all of these controls can be manipulated in real-time (e.g., via the user interface 250), according to various embodiments.

Embodiments of the Harmonizer Effect involve the following techniques: pitch detection, target-pitch determination, pitch-shifting, voice-characteristics control, and audio mixing. These techniques are described above and are further described in turn. Beginning with pitch detection, multiple techniques are possible for generating a pitch estimate as input note data 220 (e.g., using the note detection module 215 of FIG. 2). Some techniques, including deconstruction of the input audio waveform into various micro- and/or macro-musical elements, are described in U.S. patent application Ser. No. 12/024,981, which is incorporated by reference above.

Target-pitch determination involves choosing a target frequency for the melody voice and each of a set of harmony voices, if applicable. These target frequencies are chosen differently depending on the mode of reference data specification, which can be either freeform or predetermined such as by a recorded song. For example, as described above, the target frequency is a candidate reference note selected from the reference data 225 and used by the score generation module 240.

In one embodiment, a freeform song option uses key and scale specifications to choose target frequencies for the melody and each harmony voice. The target frequency for the melody is chosen by selecting the note from the active music scale and key that is closest on a logarithmic scale to the estimated frequency of the input signal. Next, the target frequency for each harmony voice is chosen using the target scale degree for the melody and a specification of the relative scale degree for each harmony voice.

In another embodiment, reference data for specific songs can be specified. For example, the song "Mrs. Robinson" by Paul Simon, might be an available option. The reference data for a given song consists of intended pitches, onset times, and durations for both the melody and the harmony voices. The closest melody pitch is chosen from the reference data and is used to correct the user's melody. The reference harmony pitches corresponding to a chosen melody pitch are then used to generate the harmonized voices. Alternatively, harmony voices can be generated using key and scale specifications as is done in freeform mode.

The pitch-shifting technique uses a signal processing algorithm by which frequency content of an input audio signal is shifted up or down without impacting the temporal characteristics. For example, the frequency content of a monophonic audio signal is shifted by a constant factor, without speeding up or slowing down the audio.

The voice-characteristics control technique serves to control the target pitch to which the user's input signal should be shifted, or to modify the signal after pitch-shifting has been applied. According to various embodiments, various characteristics can be controlled, including octave, melody and harmony gain, displacement tolerance, retune speed, vibrato frequency and depth, etc. For example, users 210 may wish to sing in an octave different from the octave native to a song. Additionally, they may wish to hear their pitch-corrected voice in either the octave in which they sang, or in the octave native to a given song. Control options exist for creating such effects; the option chosen affects the interpretation of the user's 210 estimated frequency and the values of the target frequencies used to perform pitch-shifting. In particular, the octave parameter specifies both the octave in which the user 210 is expected to sing and the octave in which the pitch-corrected voice will be heard. One option allows the user 210 to sing freely among all octaves during the course of the song; other options require the user 210 to sing in a specified octave relative to the target vocal line. These latter options may impose a level of difficulty on the act of singing.

Regarding control of melody and harmony gain, the gain (or volume, e.g., in percent or decibels) of the melody and harmony signals can be manipulated independently to create a more realistic ensemble effect. If the gain on a voice is set to zero, then the voice may be silent. Regarding control of displacement tolerance (e.g., in seconds), a high tolerance value may allow the user 210 to sing with a different rhythm than is specified by the reference data; a low tolerance value imposes the rhythm of the reference data on the user's 210 singing. Regarding control of retune speed (e.g., in milliseconds), the rate at which an input signal is pitch-shifted to a target pitch may be controlled. For example, a very fast rate may result in a robotic effect, whereas a slower rate may result in a more natural or portamento effect. Regarding control of vibrato frequency (e.g., in Hertz) and depth (e.g., in percent), each or both can be controlled by the rate and amplitude of an oscillator, such as a sine wave, that modulates the pitch-corrected signal.

Once the pitch shifting has been performed (e.g., by the effect production module 260 according to the score from the score generation module 240), an output audio waveform or other output audio data may be sent to the mixer module 270. The audio mixing technique may use the mixer module 270 to summing together scaled versions of the melody and harmony voices, so as to produce a single signal comprising the harmonized melody. As described above, the mixer module 270 may further add other voices, add effects, adjust mixing levels, adjust panning, etc.

In some embodiments, the Harmonization Effect is provided with temporal displacement tolerance functionality. Temporal Displacement Tolerance may serve as one of several voice-characteristics controls in the Harmonization Effect, for the case of a predetermined-by-song target-pitch determination specification. Notably, while the temporal displacement tolerance is described in context of the Harmonization Effect, the temporal displacement tolerance functionality may be implemented independent of the Harmonization Effect, such as in a scoring engine for musical rhythm on a computer, mobile device, or gaming platform.

According to embodiments of temporal displacement tolerance, the user's 210 performance (e.g., voice) will be analyzed and compared to a reference line. For example, the input note data 220 derived from the input audio waveform corresponding to the performance is compared by the score generation module 240 to reference data 225. In some embodiments, the technique relies on the user's 210 performing along with a recording, click-track, or other reference, to maintain reference timing (e.g., to reliably indicate the start and stop times of the singing with respect to the reference data 225). As described above, the user's 210 performance is analyzed and feedback is produced by the effect production module 260. The feedback may include an aural production of the pitch-corrected version of the input audio (with or without additional harmonization), a numerical score indicating the user's accuracy with respect to a predetermined melodic reference, and/or any other feedback derived from such a score.

In one illustrative embodiment, an analysis methodology is used with a pitch correction effect, and the functionality of the Harmonization Effect is applied only to a melody voice. The beginning of an input audio waveform (e.g., a user's 210 performance) is synchronized to a recording or other temporal reference (e.g., reference data 225, tap pad output, etc.). The synchronization may involve pitch detection techniques (e.g., using the note detection module 215) to synchronize the beginning of the user's 210 input performance with the beginning of the target recording or temporal reference. For example, the user's 210 digital audio signal is processed sequentially in a block of audio samples (e.g., 1024 samples each of a unit duration in time length). The signal may also exist at a known sample rate, such that the start time of each block relative to the temporal reference is known in units of seconds as well as samples. Other sampling rates and sample block sizes may be used, or other techniques for timing may be used.

Feature extraction (e.g., pitch estimate calculation) may be performed on each block of audio by estimating the fundamental frequency of the audio signal in the block. This frequency estimate is quantitatively compared to reference data 225, yielding a score (e.g., a cost value). A temporal displacement tolerance parameter controls the temporal range of reference data 225 used in the comparison. For example, with a temporal displacement tolerance value of 1.5 seconds, the current block's frequency estimate is compared to all reference frequencies up to 1.5 seconds prior to and in advance of the block's start time. A high temporal displacement tolerance parameter value allows the user to sing with a different rhythm than is specified by the reference pitches; a low parameter value imposes the rhythm of the reference pitches on the user's singing. The temporal displacement tolerance parameter correlates to the size of the temporal window described above.

These comparisons serve to select the reference frequency closest to the estimated frequency on a logarithmic scale (e.g., to find a candidate reference note). This selected reference frequency is the target frequency to which the block of audio will be corrected by the pitch-shifting algorithm. The difference between the time of the selected reference frequency and the time of the audio block is the effective temporal error for that audio block, given the reference data for the active song. In this way, the user's input performance is corrected to the target performance via matching to a reference map. The user's input performance can be "pitch corrected" to the pitches in the reference map that are determined to be closest to the time of the detected audio input, whether the user's performance comprises spoken words or sung words, and whether the user's performance comprises words that are pitched or un-pitched (e.g., spoken, rapped, etc.).

Additional or alternative time-based error metrics can be computed, such as the temporal error of note onsets, temporal error of note duration, and overall tempo error. As discussed above, these can be used by the score generation module 240 to generate one or more types of performance score. Further, various types of analysis, such as those described above, can be used in effects other than pitch correction. For example, a Harmonization Effect could use specified scale and key information or harmony reference data to choose additional frequencies, related to the selected reference frequency, to which the audio block could be pitch shifted or by which harmony notes can be selected or generated. Additionally, the analysis described above could be applied to multiple audio signals simultaneously. Similarly, a temporal displacement tolerance analysis technique could be used in applications unrelated to pitch-detection and pitch-shifting. For example, an analogous framework could be applied to more arbitrary sound types, such as spoken voice, to provide rhythmic and/or inflective scoring.

Embodiments of the system 200 may provide additional functionality, as well. In some embodiments, a rhythmic reference is used for echo generation. For example, a tap pad or other reference data 225 generator is used in a gaming environment (video/computer/mobile platform gaming context) or live performance environment to produce a reference timing interval (e.g., as an elapsed time between two taps). The time interval between the two taps is then used to control an echo interval during game play or performance.

In one illustrative embodiment, a user 210 taps on a touch-pad input device and thereby defines a desired time interval. The time interval is used as the time interval for an echo effect plug-in. For example, a game on a computer game console device or similar platform might be able to receive a time interval for setting an echo effect. This feature of the system permits a user to define the time interval by tapping on a touch-pad input device rather than manually setting a time value in discrete time elements, such as by specifying a 0.5 second interval. It may be easier or more desirable to tap out a time interval than to select the time interval by digits.

In some other embodiments of the system 200, an effect map is provided for affecting various audiovisual effects. For example, the map of audio effects may allow easy user 210 comparison and review of all audio effects that are available, currently being applied, currently not being applied, etc. For example, if the selected specific point in a song for the 0.5 second echo time is referred to as "A", and if the harmony is tuned to a third above the vocal line, then at time "A" an echo will occur to provide a single harmonized input vocal line at 0.5 second past time "A" at a third above. The user may set up the audio effect map, such as by specifying: "At time 'A,' produce an echo at a third above the vocal line."

Results from the score generation module 240, the effect production module 260, the window gating module 235, etc. may be represented in various ways. Some embodiments of the user interface 250 are configured to display one or more graphical representations of the score generation module 240 results. Some illustrative representations are illustrated in FIGS. 3A-5B.

Figure 3A:
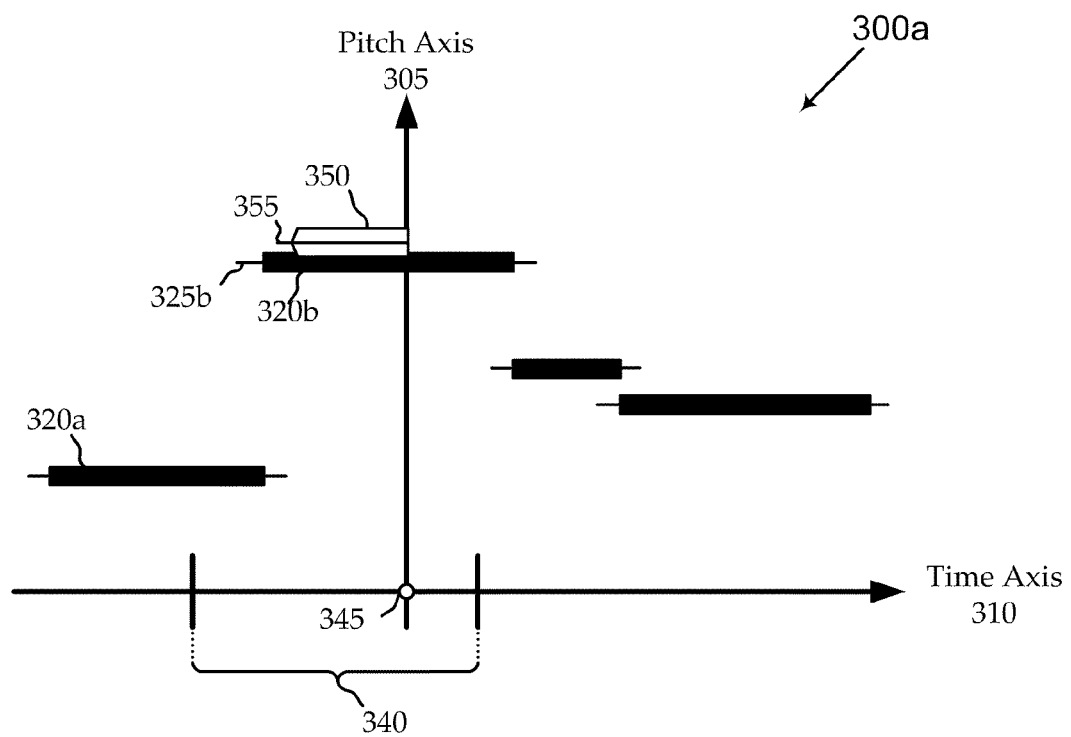
FIG. 3A shows an illustrative graphical representation of score generation using a temporal window, according to various embodiments.

FIG. 3A shows an illustrative graphical representation 300a of score generation using a temporal window 340, according to various embodiments. The graphical representation 300a is shown in the context of a pitch axis 305 versus a time axis 310. In the illustrative embodiment, the pitch axis 305 crosses the time axis 310 at an origin point 345 indicating the current time estimate. In other embodiments, the origin point 345 may indicate a current playback location in the reference track, or some other time location. Further, in other embodiments, the current time estimate, current playback location in the reference track, etc. may be represented in other ways.

Reference notes 320 are graphed in the context of the pitch axis 305 and the time axis 310, where the horizontal length of each reference note 320 indicates its duration (e.g., the horizontal bar begins at the note onset and ends at the note offset) and a horizontal center line 325 through the reference note 320 indicates the reference pitch associated with the reference note 320. The graphical representation 300a may also include input note data 220, such as an input note 350 that begins at a detected note onset and has a center line 355 through the input note 350 indicating the pitch estimate associated with the input note 350. The input note 350 is shown ending at the pitch axis 305, because the input note represents a live performance note and the pitch axis 305 crossing in the current time estimate (i.e., there is no input note data 220 into the future). Thus, as the live performance proceeds, the reference notes 320 will move across the display from the right toward the left. In other embodiments (e.g., where the input audio waveform is from a recorded performance), input note data 220 may be available past the current time estimate and may be represented differently.

As illustrated, the input note 350 is slightly sharp and slightly late with respect to the closest reference note 320*b*. For example, the score generation module 240 may generate a pitch score and a rhythm score that indicate a performance that correlates reasonably closely with the reference data 225. This condition may be represented in other ways, as well. For example, FIG. 3B shows another illustrative graphical representation 300*b* of the condition represented in FIG. 3A, according to various embodiments.

Figure 3B:
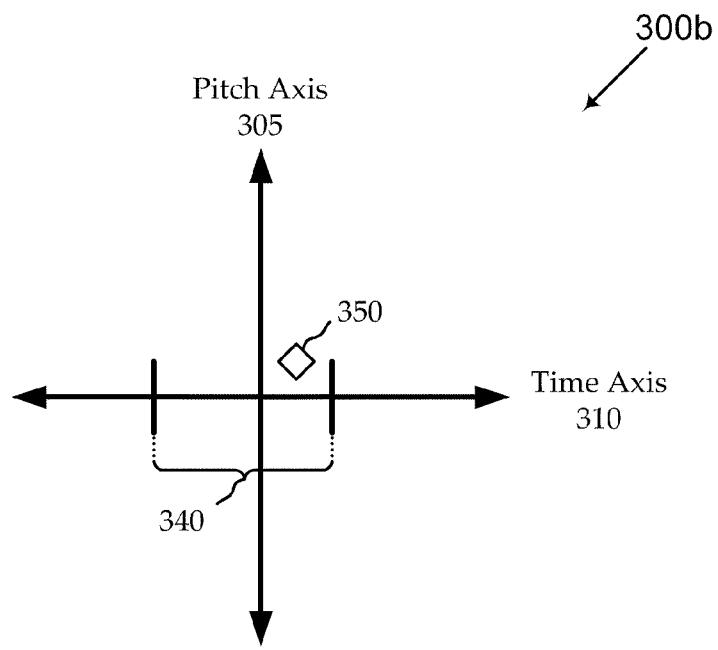
FIG. 3B shows another illustrative graphical representation of the condition represented in FIG. 3A, according to various embodiments.

As in FIG. 3A, the graphical representation 300*b* of FIG. 3B includes the pitch axis 305 and the time axis 310 and representations of the temporal window 340 and the input note 350. According to the graphical representation 300*b*, the origin represents a perfect (e.g., or substantially perfect) correlation between the input note data 220 of the input audio waveform and the reference data 225. For example, the input note 350 is shown slightly right and above the origin, which may indicate again that the input note 350 is slightly sharp and late with respect to the candidate reference note 340*b*.

It is worth noting that the temporal window 340 is shown in both FIGS. 3A and 3B as asymmetric around the current time estimate (e.g., the origin point 345 of FIG. 3A). In particular, the temporal window 340 apparently indicates a smaller tolerance for "lateness" than for "earliness." As described above, the temporal window 340 may be adjustable (e.g., dynamically, in real time, etc.) by a user 210 via the user interface 250. In one embodiment, the user interface 250 includes a representation, like the graphical representation 300*b* of FIG. 3B, and the temporal window 340 changes graphically to reflect user 210 adjustments to the temporal window 340. For example, as described in greater detail below, a conventional display cursor can be manipulated to select one edge or value of the temporal window and graphically adjust its value, or a display input box may be used to provide a value for the temporal window.

Figure 4A:
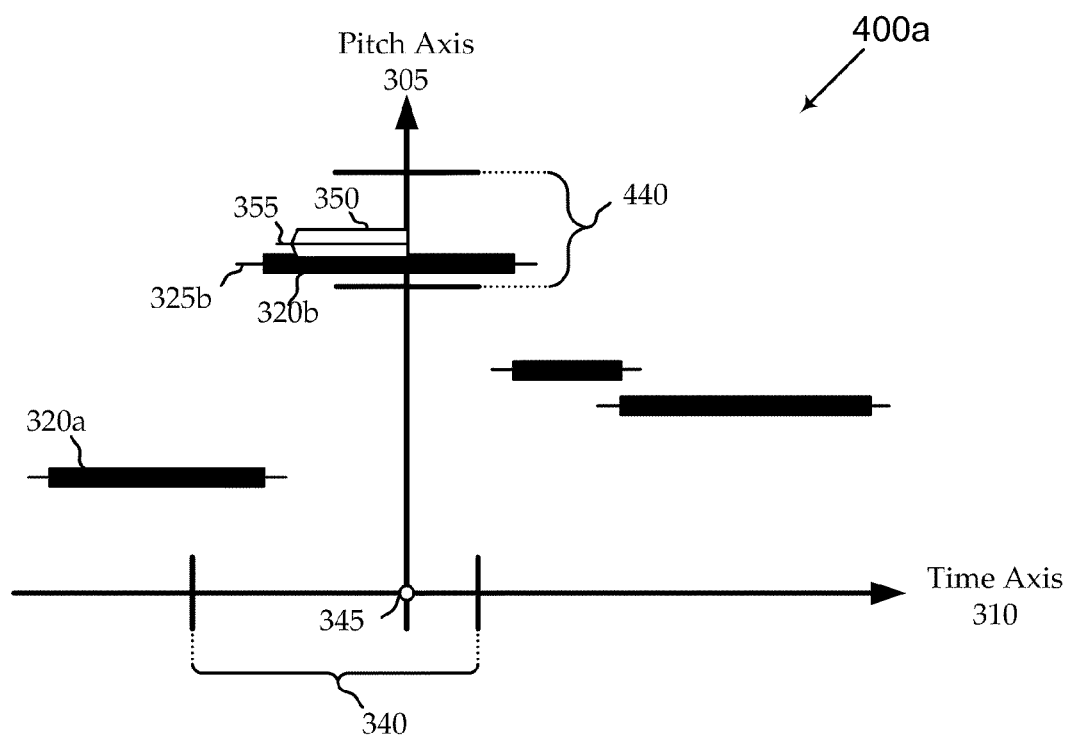
FIGS. 4A and 4B show illustrative graphical representations of score generation using both a temporal window and a pitch window, according to various embodiments.
Figure 4B:
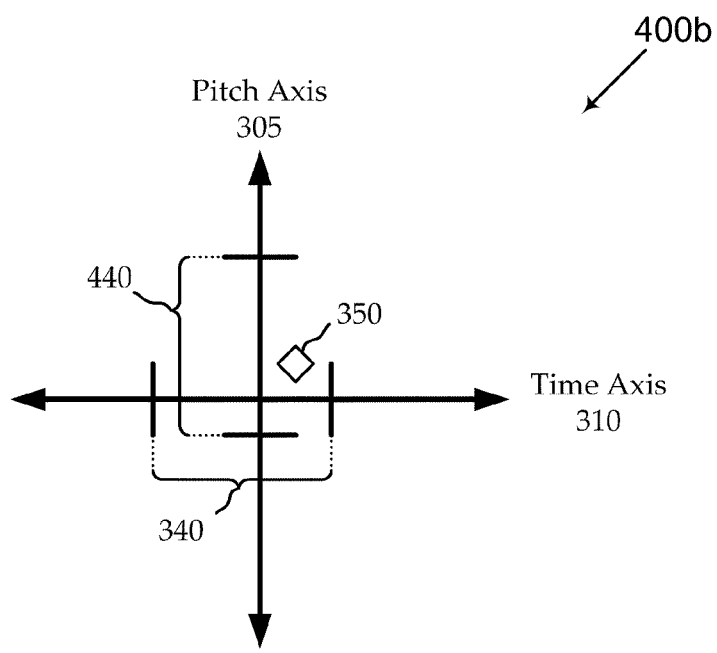

FIGS. 4A and 4B show illustrative graphical representations 400 of score generation using both a temporal window 340 and a pitch window 440, according to various embodiments. Again, the graphical representations 400 are shown in the context of a pitch axis 305 versus a time axis 310, where the pitch axis 305 crosses the time axis 310 at an origin point 345 indicating the current time estimate. Reference notes 320 and the input note 350 are graphed as in FIGS. 3A and 3B. Both of FIGS. 4A and 4B represent the input note 350 as slightly sharp and slightly late with respect to the closest reference note 320*b*.

Notably, the embodiments of FIGS. 3A and 3B include only a temporal window 340, such that they may only reflect rhythm window gating functionality. FIGS. 4A and 4B, however, include both a temporal window 340 and a pitch window 440 (e.g., both of which may be dynamically adjustable). This may reflect embodiments that provide rhythm window gating functionality and pitch window gating functionality.

For example, two reference notes 320 are shown as at least partially overlapping the temporal window 340, such that there may be two potential candidate reference notes 320. The candidate reference note 320 may be selected as reference note 320*b*, which has a reference pitch that is closest to the pitch estimate of the input note 350. In the embodiment of FIGS. 3A and 3B (i.e., without pitch window gating functionality), the input note 350 may be pitch shifted to the reference pitch of the reference note 320 (e.g., such that the center line 355 of the input note 350 is substantially collinear with the center line 325 of the candidate reference note 320*b*). In the embodiment of FIGS. 4A and 4B (i.e., with additional pitch window gating functionality), the input note 350 may be pitch shifted to the reference pitch of the reference note 320 only when the pitch window gating condition is satisfied.

Figure 5A:
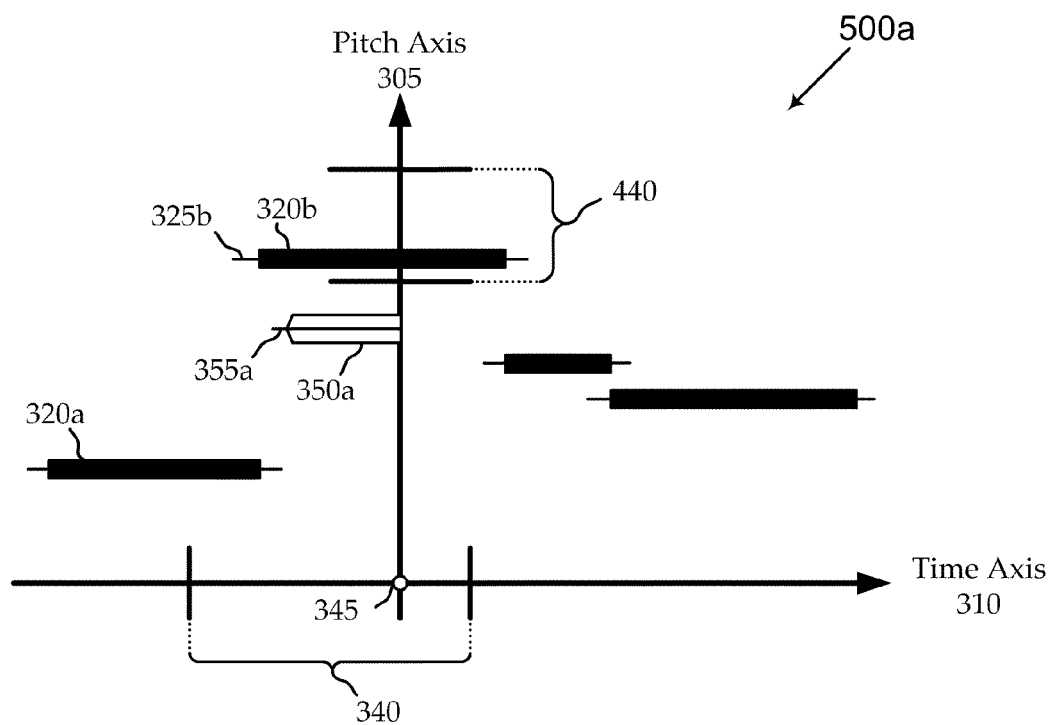
FIGS. 5A and 5B show illustrative graphical representations of score generation using both a temporal window and a pitch window, where a pitch window gating condition is not satisfied, according to various embodiments.
Figure 5B:
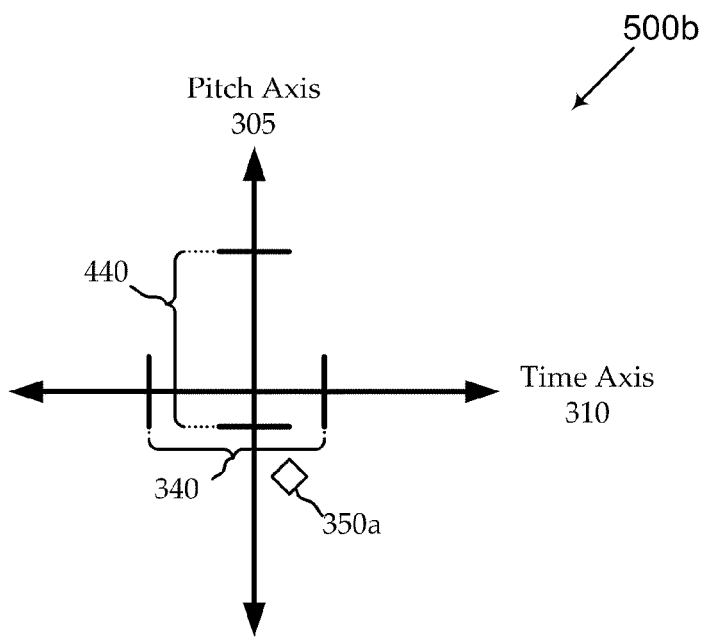

For example, FIGS. 5A and 5B show illustrative graphical representations 500 of score generation using both a temporal window 340 and a pitch window 440, where a pitch window gating condition is not satisfied, according to various embodiments. Again, the graphical representations 500 are shown in the context of a pitch axis 305 versus a time axis 310, where the pitch axis 305 crosses the time axis 310 at an origin point 345 indicating the current time estimate. Reference notes 320 and the input note 350 are graphed as in FIGS. 3A-4B. Both of FIGS. 5A and 5B represent the input note 350 as slightly flat and slightly late with respect to the closest reference note 320*b*.

As in FIGS. 4A and 4B, the embodiments of FIGS. 5A and 5B include both a temporal window 340 and a pitch window 440, which may reflect embodiments that provide rhythm window gating functionality and pitch window gating functionality. Unlike FIGS. 4A and 4B, however, the embodiments of FIGS. 5A and 5B show the pitch estimate of the input note 350 as falling outside the pitch window 440. As such, the pitch window gating condition represented by the pitch window 440 may not be satisfied. For example, the input note 350 may not be pitch shifted to the reference pitch of the reference note 320 because the pitch window gating condition is not satisfied.

Figure 6:
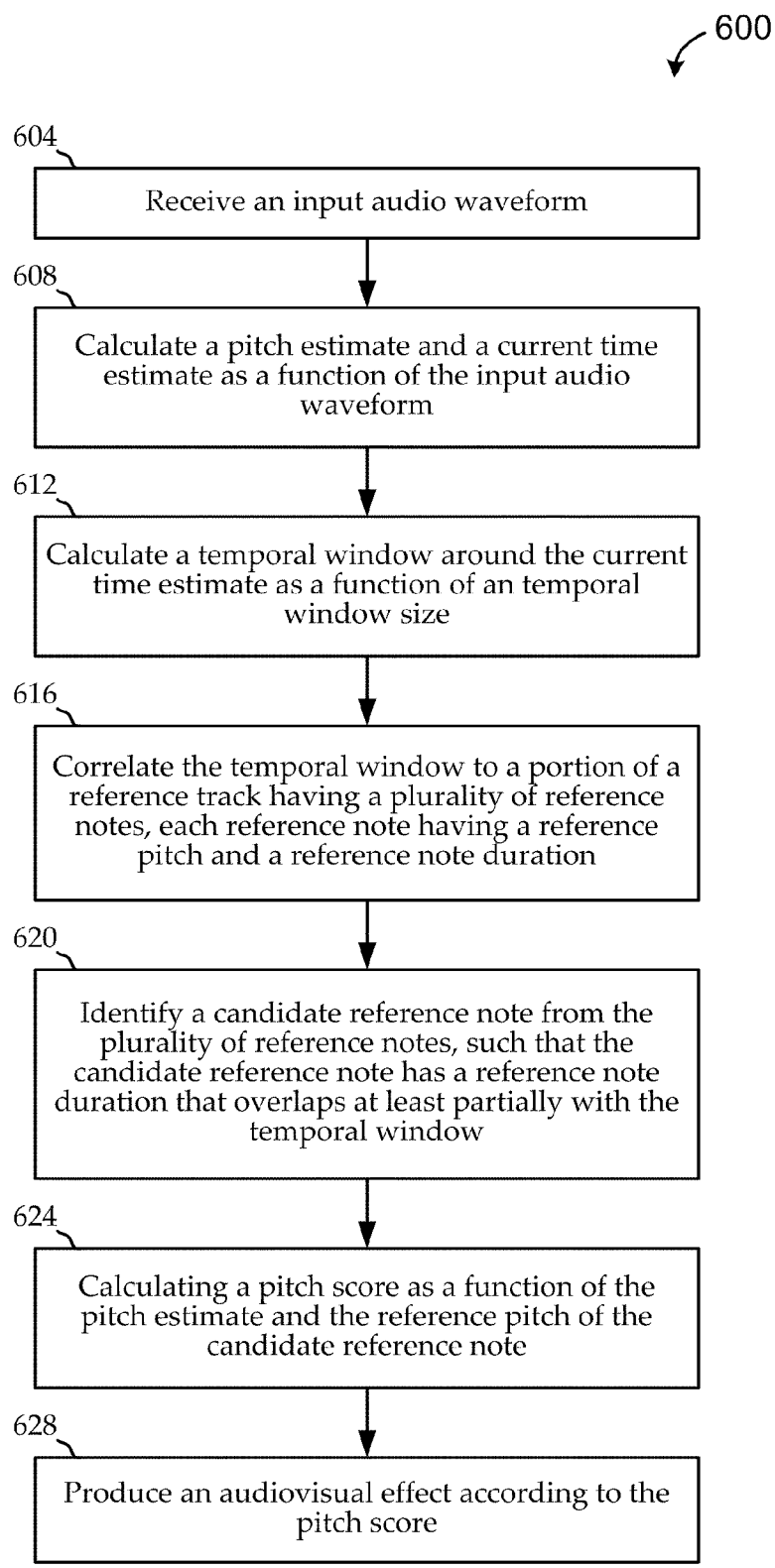
FIG. 6 shows a flow diagram of an illustrative method for producing an audiovisual effect according to an input audio performance, according to various embodiments.

Embodiments of systems of the invention, including those described with reference to FIGS. 1 and 2, may be used to implement various methods. Some methods are illustrated by and described with reference to FIGS. 6-9. Turning to FIG. 6, a flow diagram of an illustrative method 600 is shown for producing an audiovisual effect according to an input audio performance, according to various embodiments.

Embodiments of the method 600 begin at block 604 by receiving an input audio waveform (e.g., from a live or recorded performance, etc.). At block 608, a pitch estimate and a current time estimate are calculated as a function of the input audio waveform. For example, the note detection module 215 generates input note data 220 from the input audio waveform.

A temporal window may then be calculated around the current time estimate as a function of a temporal window size at block 612. For example, the window gating module 235 may calculate the temporal window size and position according to the current time estimate, input data from the user 210 via the user interface 250, etc. At block 616, the temporal window may be correlated to a portion of a reference track having reference notes, each reference note having a reference pitch and a reference note duration. For example, the reference notes may be received from reference data 225 stored in a data repository 108.

Figure 7:
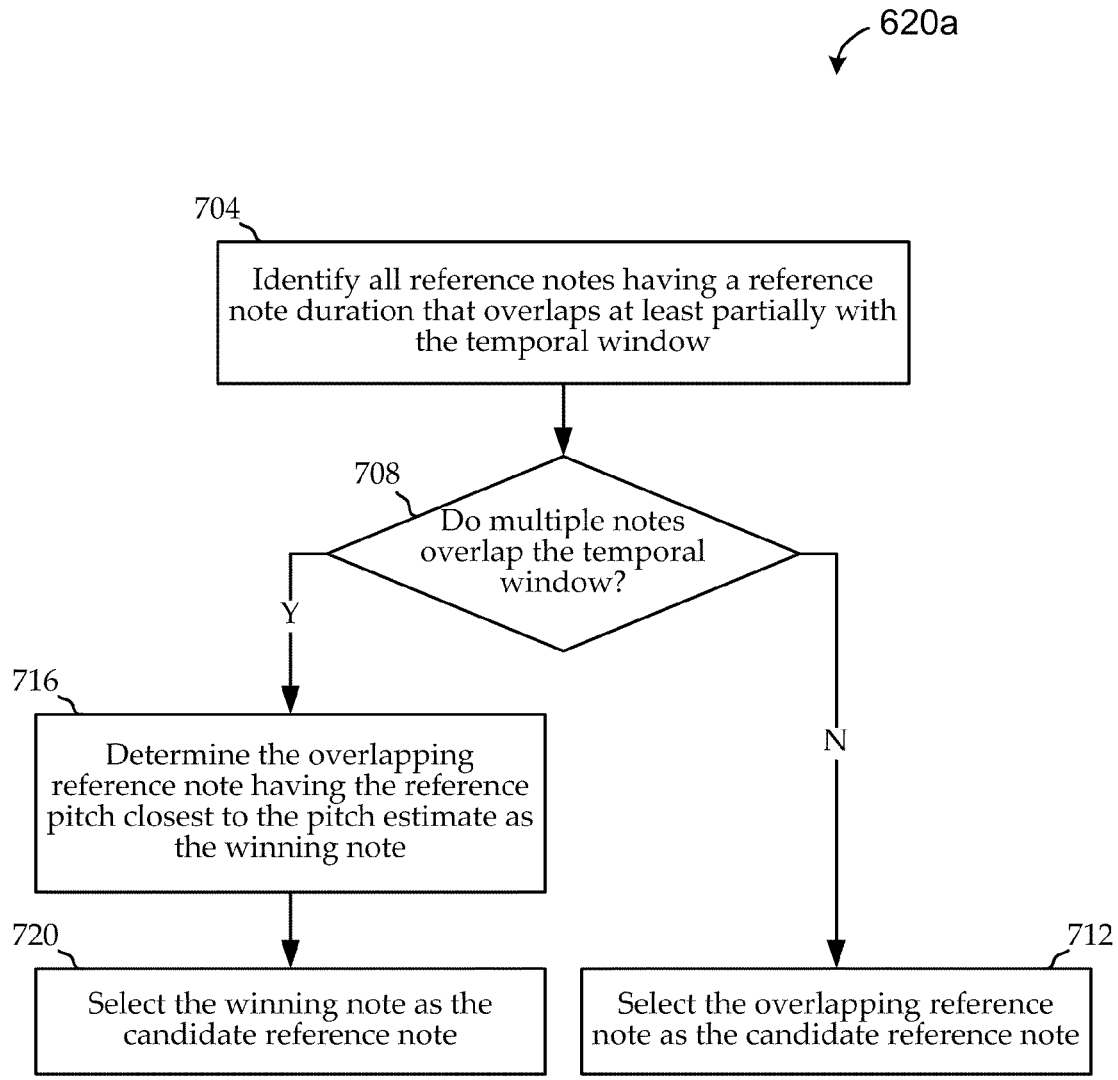
FIG. 7 shows a flow diagram of an illustrative method for identifying a candidate reference note for score generation, according to various embodiments.

At block 620, a candidate reference note may be identified from the plurality of reference notes, such that the candidate reference note has a reference note duration that overlaps at least partially with the temporal window. For example, the candidate reference note is identified by the candidate selector module 230 and passed to the score generation module 240. As described above, some embodiments may include selection or identification of an appropriate candidate reference note, for example, by the candidate selector module 230. FIG. 7 shows a flow diagram of an illustrative method 620a for identifying a candidate reference note for score generation, according to various embodiments. Embodiments of the method 620a illustrate a more detailed embodiment of block 620 of the method 600 of FIG. 6.

Embodiments of the method 620a begin at block 704 by identifying all reference notes having a reference note duration that overlaps at least partially with the temporal window. At block 708, a determination is made as to whether multiple notes overlap the temporal window. If it is determined, at block 708, that multiple notes do not overlap the temporal window (i.e., only a single note overlaps), the overlapping reference note may be selected as the candidate reference note at block 712. If it is determined, at block 708, that multiple notes do overlap the temporal window, a further determination may be made of the overlapping reference note having the reference pitch closest to the pitch estimate as the winning note at block 716. At block 720, the winning note may be selected as the candidate reference note.

Returning to FIG. 6, at block 624, a pitch score (e.g., and/or other performance scores) may then be calculated as a function of the pitch estimate and the reference pitch of the candidate reference note (e.g., determined by the score generation module 240 according to block 620 or the method 620a of FIG. 7). At block 628, an audiovisual effect is produced according to the pitch score (e.g., and or other performance scores).

Figure 8:
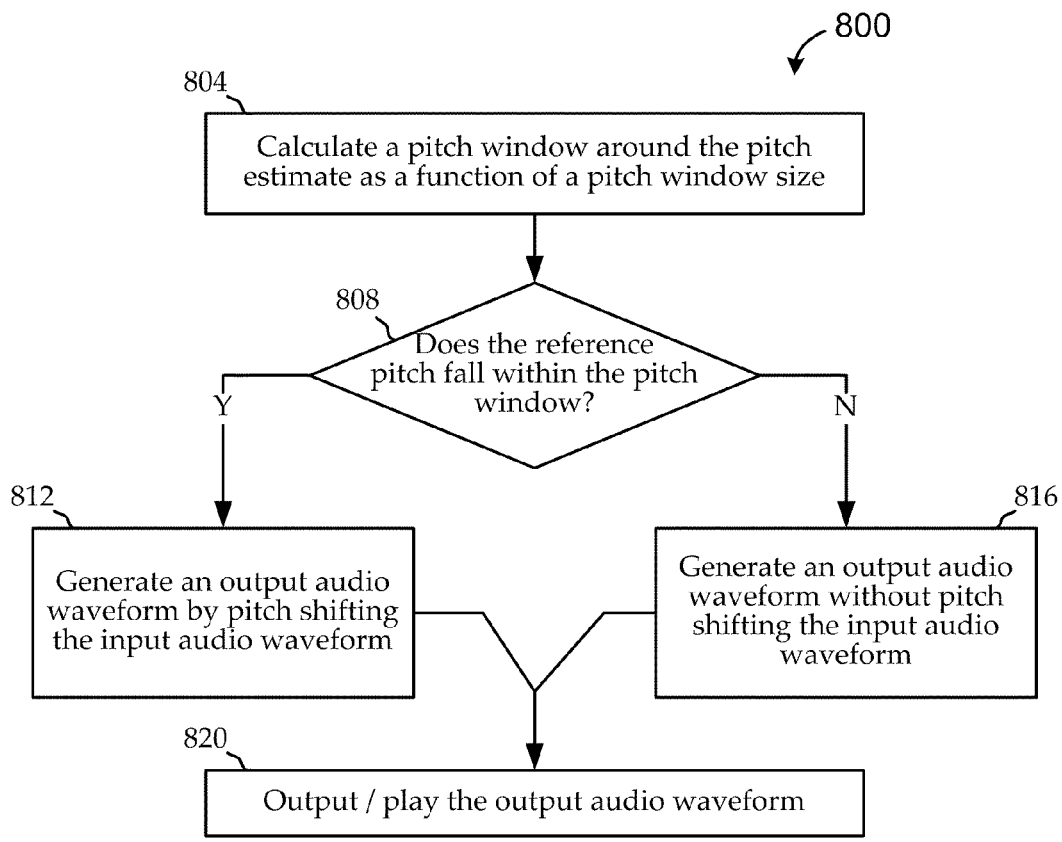
FIG. 8 shows a flow diagram of an illustrative method for using window gating to affect pitch shifting, according to various embodiments.

As discussed above, the pitch score generation at block 624 and/or the audiovisual effect production at block 628 may be affected by window gating. For example, FIG. 8 shows a flow diagram of an illustrative method 800 for using window gating to affect pitch shifting, according to various embodiments. The method 800 begins at block 804 by calculating a pitch window around the pitch estimate as a function of a pitch window size. The pitch window size may be determined as a function of user 210 input, or in any other useful way, as described above.

At block 808, a determination is made as to whether the reference pitch falls within the pitch window. For example, the determination may indicate whether a pitch window gating condition is satisfied. If it is determined, at block 808, that the reference pitch falls within the pitch window, an output audio waveform may be generated by pitch shifting the input audio waveform at block 812. If it is determined, at block 808, that the reference pitch falls outside the pitch window, an output audio waveform without pitch shifting the input audio waveform (e.g., at least without pitch shifting according to this determination) at block 816. In some embodiments, at block 820, the output audio waveform is output to an interface, a playback system, a storage system, etc.

Figure 9:
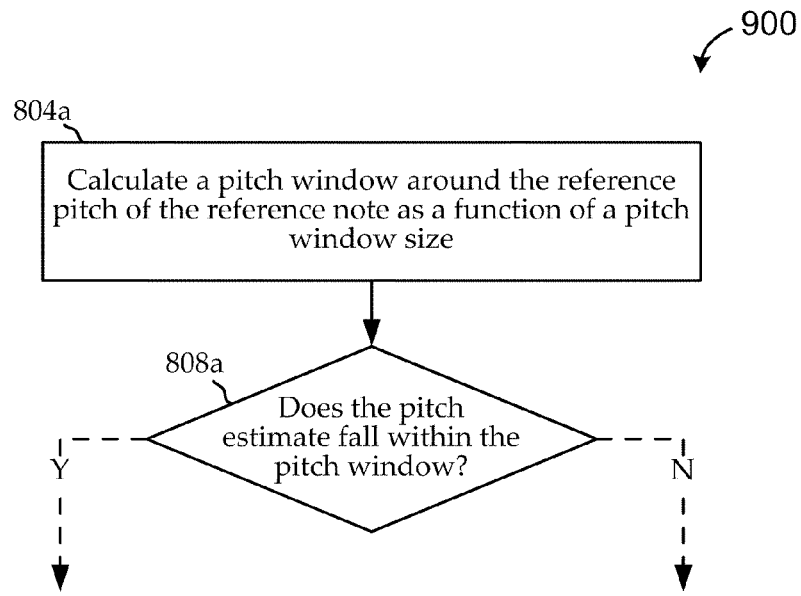
FIG. 9 shows a flow diagrams of another illustrative method for using window gating to affect pitch shifting, according to an alternate embodiment of the method of FIG. 8.

FIG. 9 shows a flow diagram of another illustrative method 900 for using window gating to affect pitch shifting, according to an alternate embodiment of the method 800 of FIG. 8. The method 900 begins at block 804a by calculating a pitch window around the reference pitch of the reference note as a function of a pitch window size. At block 808a, a determination is made as to whether the pitch estimate falls within the pitch window. The method 900 may proceed according to blocks 812, 816, and 820 of the method 800 of FIG. 8.

For example, as described above, an input audio waveform is received. A pitch estimate is calculated as a function of the input audio waveform. An adjustment is received to a pitch window size substantially concurrently with receiving the input audio waveform, the pitch window size defining extents of a pitch window from a first pitch location below a pitch window anchor to a second pitch location above the pitch window anchor. The adjustment may or may not be received in real time. In some embodiments, the adjustment is received by a user (e.g., via a graphical user interface). In other embodiments, the adjustment is received by a computer system (e.g., from a computer-initiated instruction). For example, the computer may use a predefined program or the computer may analyze the reference data to dynamically generate a program for affecting the window size adjustment.

A pitch window anchor may then be correlated to a reference pitch corresponding to a candidate reference note, the candidate reference note being one of a plurality of reference notes of a reference track. A pitch score may be calculated as a function of the pitch estimate and the reference pitch of the candidate reference note. An audiovisual effect may then be produced (e.g., and/or output) according to the pitch score and the pitch window. For example, pitch shifting may be implemented according to the pitch window.

In some typical embodiments, functionality of the systems and methods described above are implemented via one or more interactive environments and facilitated via one or more types of user interface 250. Embodiments of user interfaces are shown in FIGS. 10-23. It will be appreciated that these screenshots are intended only to provide further clarity by showing limited illustrative implementations in limited environments. As such, the screenshots should not be construed as limiting the scope of embodiments.

Figure 10:
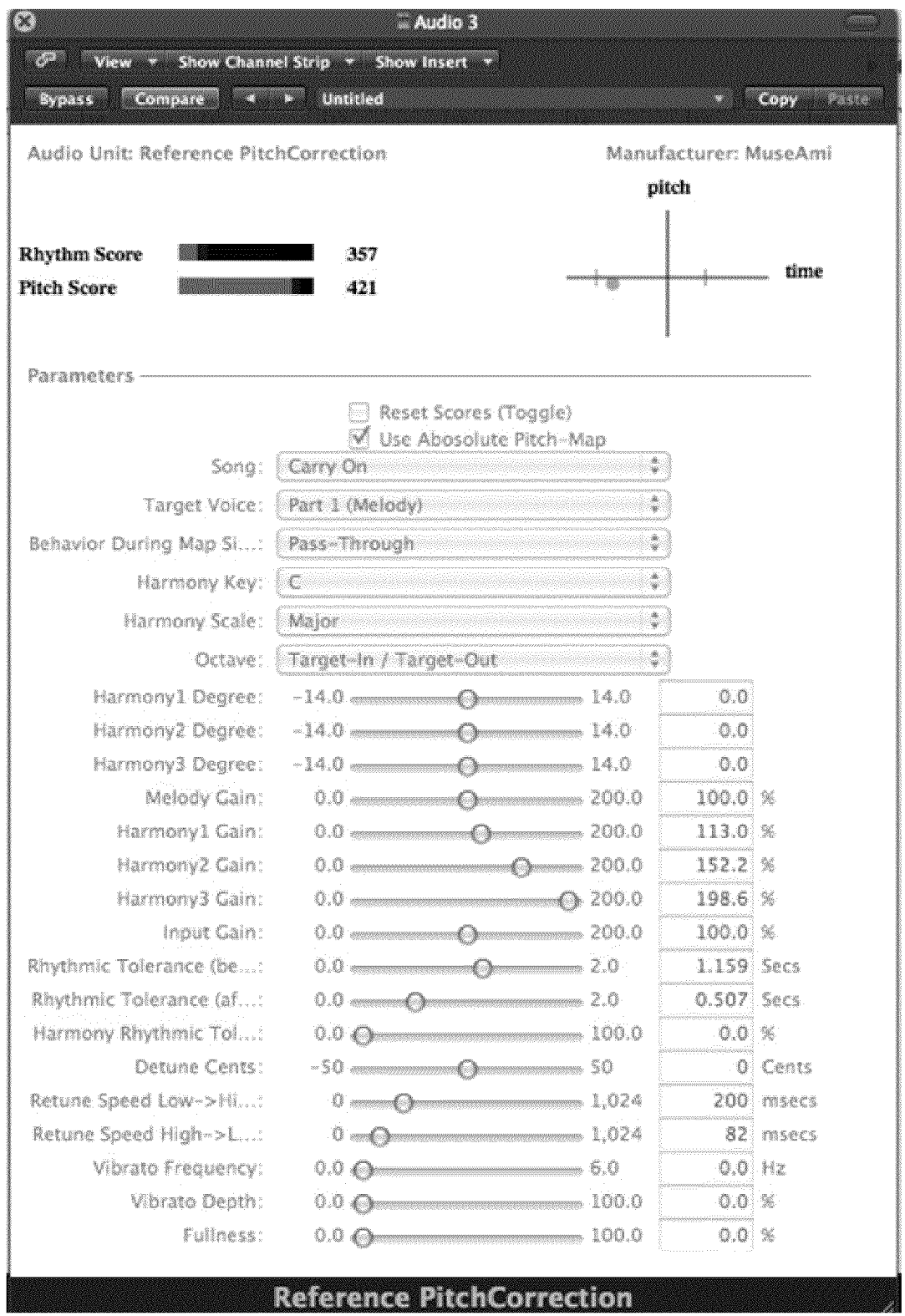
FIG. 10 shows a user interface window (i.e., screenshot) on a computer display of a computer executing a software program that is configured to provide some of the features described above.

FIG. 10 shows a user interface 250 window (i.e., screenshot) on a computer display of a computer executing a software program that is configured to provide some of the features described above. The software program may be provided through various system interfaces, for example, as a "standalone" program executed by the system 200, or as an adjunct program such as a plug-in that operates within a host program. As illustrated, the "song" selection is "Carry On" with the target voice selection set to "Part 1 (Melody)." This may indicate that the reference data 225 used for comparison (e.g., for score generation) is the melody line (e.g., as a MIDI reference note set) of the selected song.

Figure 11:
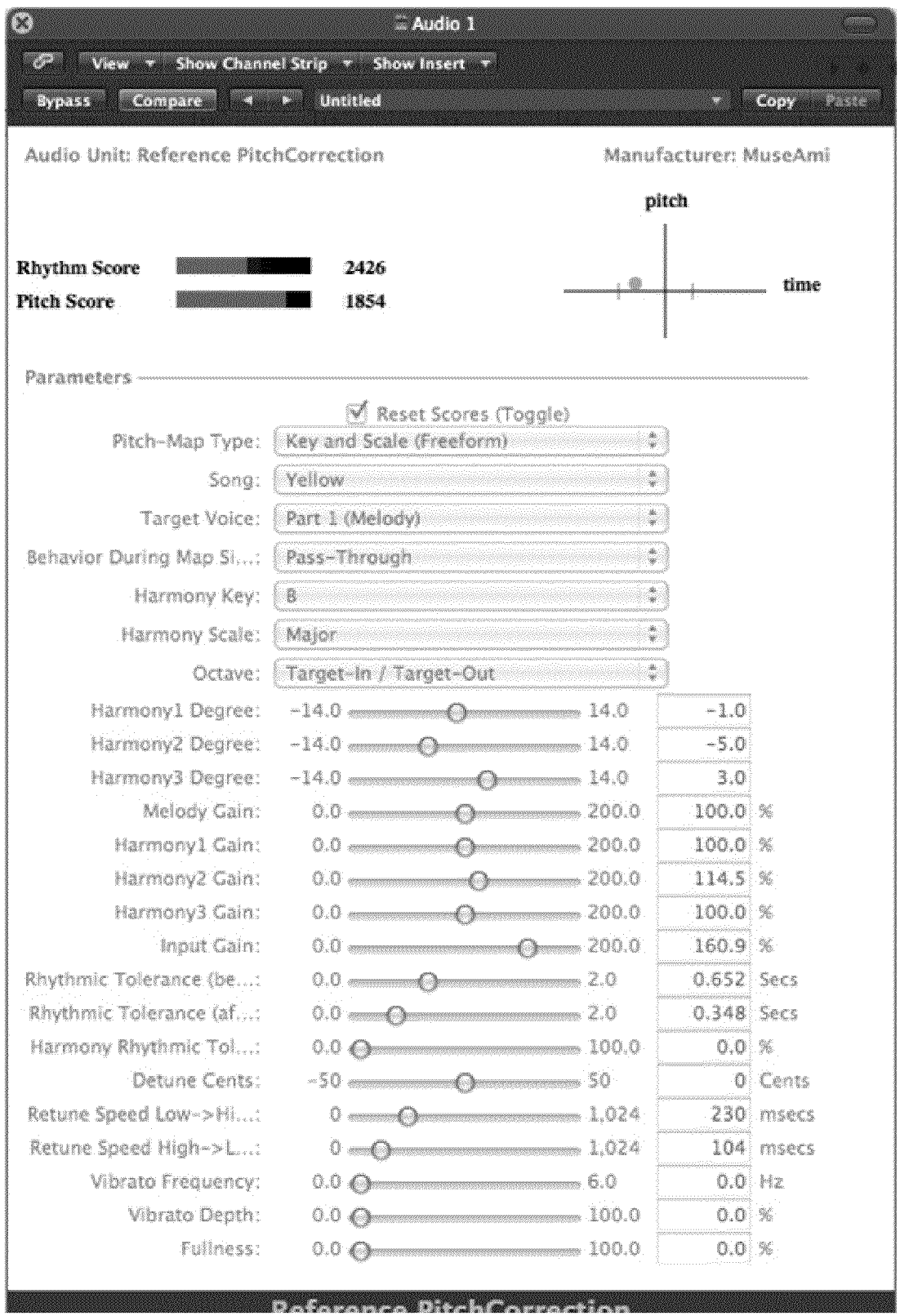
FIG. 11 shows another user interface window, like the one shown in FIG. 10, but with the "song" selection set to "Key and Scale (Freeform)"

FIG. 11 shows another user interface 250 window, like the one shown in FIG. 10, but with the "song" selection set to "Key and Scale (Freeform)." This may indicate that the system 200 will not reference MIDI pitch maps to correct the input performance. Instead, the system 200 may look to harmony key and harmony scale settings, and will correct each note of the input performance to the closest note in the selected harmony key and scale.

It is worth noting that FIGS. 10 and 11 include scoring output representations, like those discussed with reference to FIGS. 3A-5B (illustrated without pitch gating functionality). The representations may provide visual feedback for performance scores and for current window gating settings. For example, the screenshots show a pitch score and a rhythm score, and a graphical representation of the current size of the temporal window for rhythm window gating.

In some embodiments, multiple instances of scoring (e.g., relating to pitch correction and harmonization, etc.) could be invoked to allow multiple users to sing together, with specific effect parameters being dependent on the song. For instance, in some songs only pitch-correction would be applied to each vocal input, whereas in other songs pitch-correction might be applied to the melody vocal input, while both pitch-correction and harmonization would be applied to the back-up vocal input. Where multiple instances of scoring are invoked, the user interface may include multiple scoring representations (e.g., on separate sets of axes, overlaid on one set of axes, etc.).

Figure 12:
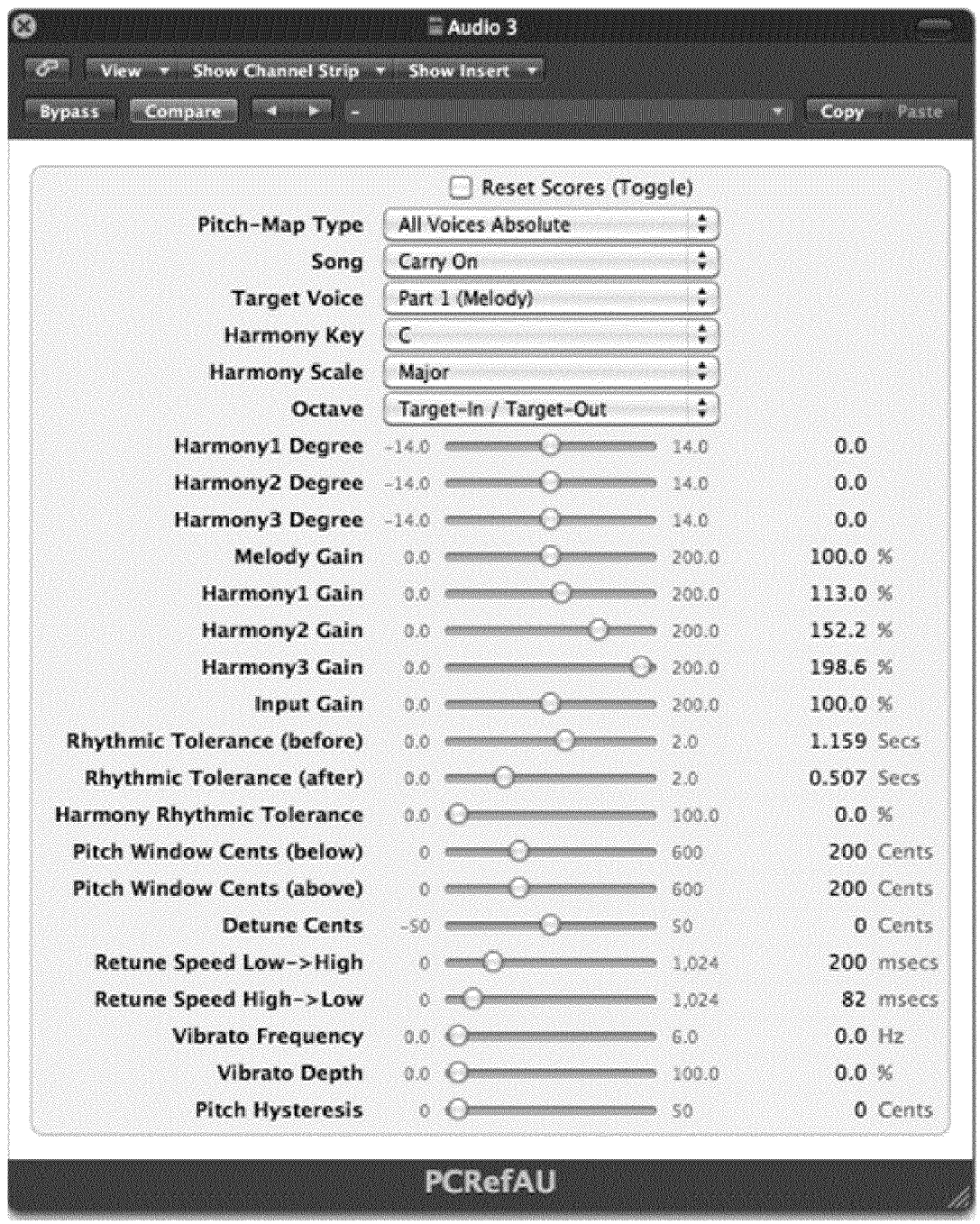
FIGS. 12 and 13 show yet other user interface windows, like the ones shown in FIGS. 10 and 11, with additional controls for pitch window gating.
Figure 13:
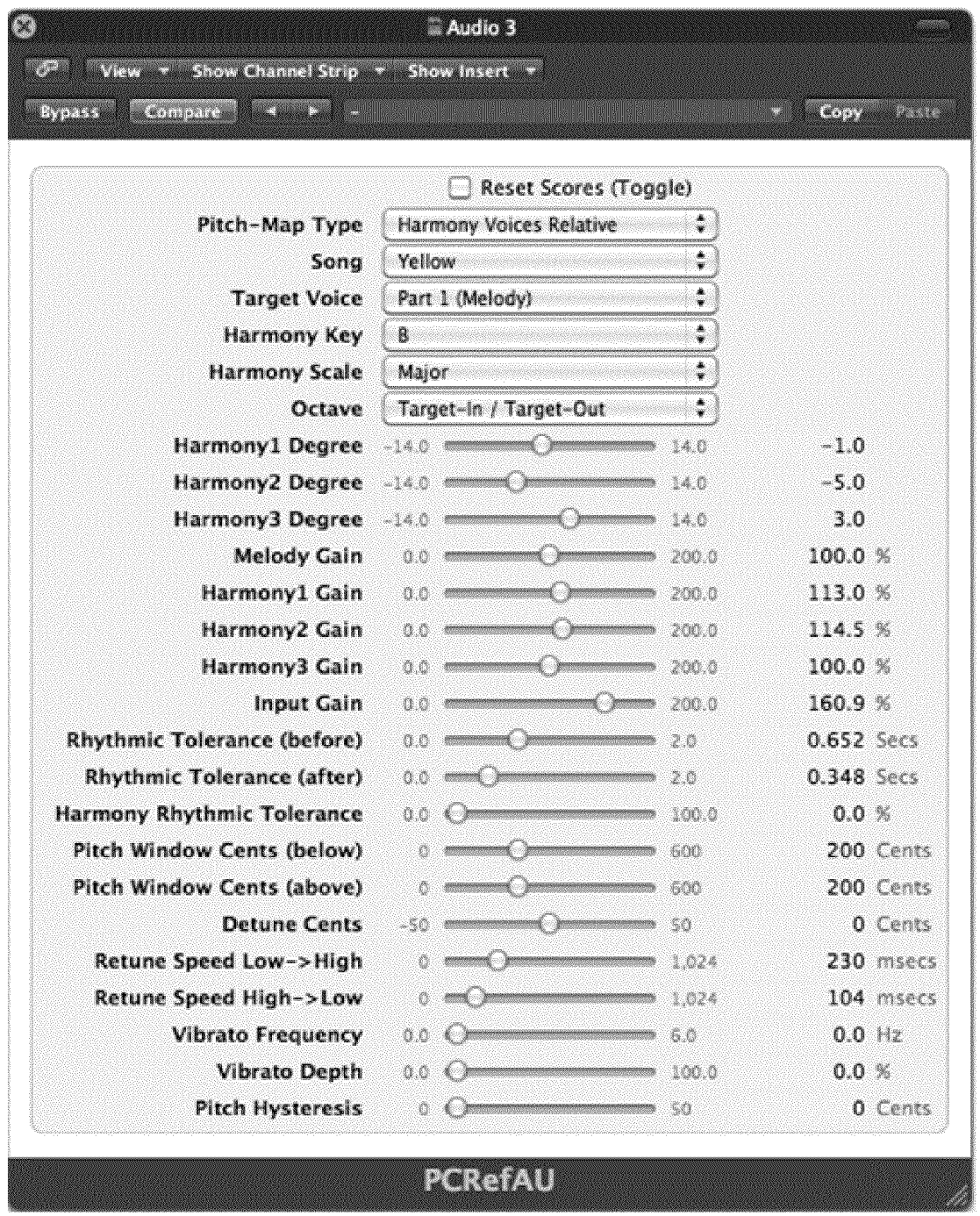

FIGS. 12 and 13 show yet other user interface 250 windows, like the ones shown in FIGS. 10 and 11, with additional controls for pitch window gating. In particular, "Pitch Window" (below and above) controls are provided. These controls may be used to dynamically control the extents of the pitch window in symmetrical or asymmetrical ways.

Various features and controls of the illustrative screenshots of FIGS. 10-13 will be described. The descriptions are intended to illustrate certain functionality and should not be construed as limiting.

The "Song" parameter is used to choose among song names for which predefined pitch and parameter maps exist. For example, this parameter might assume values "Mrs. Robinson" or "Rooftops"; additionally, there is a parameter value "Freeform" that identifies the pitch-mapping method as being solely derived from the specified key and scale. In some embodiments, the drop-down menu includes all recorded songs that are available (e.g., from a local or remote storage location). For example, an online music library, a system library of recorded music, or the like, will determine the songs that are available in the drop-down list.

The "Harmony Key" parameter specifies the key in which harmonization should occur in the Freeform Song mode. This parameter may also serve as part of the harmonization data for non-freeform songs. The "Harmony Scale" parameter specifies the scale in which harmonization should occur in the Freeform Song mode. Previously this parameter also served as part of the harmonization data for non-Freeform Songs. For example, the user may use the harmony key and scale selections to work within western seven-tone major and minor scales, twelve-tone scales, modal scales, pentatonic scales, altered scales, ragas, and/or any other useful type of harmony key.

The "Octave" parameter specifies both the octave in which the user is expected to sing and the octave in which the pitch-corrected voice will be heard. One option allows the user to sing freely among all octaves during the course of the song; other options require the user to sing in a specified octave relative to the target vocal line. These latter options impose a level of difficulty on the act of singing.

The "Harmony Degree" parameter allows multiple (e.g., four) harmony voices to have individual gain and degree parameters. The Harmony Degree parameter corresponds to a relative scale degree. For example, a Harmony Degree of "2" corresponds to two scale degrees above the pitch-corrected melody note; in any mode of the standard seven-note Major scale, this would correspond to an interval of a "third" above the pitch-corrected melody note.

The "Melody Gain" parameter serves as the volume control for the pitch-corrected vocal input.

The "Harmony Gain" parameters serve as volume controls for the respective harmony voices.

The "Input Gain" parameter serves as a level control prior to any processing. A higher input gain will result in a louder output signal.

The "Rhythmic Tolerance" parameter (e.g., illustrated as "Displacement Tolerance" in some embodiments) controls the temporal range of reference pitches that should be searched to select the target-pitch for pitch-correction (e.g., the temporal window). Of these reference pitches, the one closest to the user's pitch is chosen as the target-pitch. For example, with a Rhythmic Tolerance value of 1.5 seconds, the current frequency estimate of the user's input is compared to all reference frequencies up to 1.5 seconds prior to and in advance of the current time, and the closest reference frequency is used to pitch-correct the user's input. A high Rhythmic Tolerance parameter value allows the user to sing with a different rhythm than is specified by the reference pitches; a low parameter value imposes the rhythm of the reference pitches on the user's singing.

The "Detune Cents" parameter shifts the standard pitch definition by the specified pitch cents. For example, if a Detune Cents parameter value of "−10" cents were specified, the standard "A" pitch of 440 Hz would now be replaced by $440*2^{((-10/100)/12)}$ Hz. This parameter is useful for matching the tuning used for pitch-correction to the tuning used on pre-recorded tracks.

The "Retune Speed Low→High" parameter controls the rate at which an input signal is pitch-shifted to a target pitch. A very fast rate results in a robotic effect, whereas a slower rate results in a more natural or portamento effect. The parameter name "Low→High" indicates that this retune speed parameter only applies to notes transitions for which the second note has a higher pitch than the first note. The "Retune Speed High→Low" parameter applies to notes transitions for which the second note has a lower pitch than the first note.

The "Vibrato Frequency" parameter controls the frequency of a modulating control signal, such as a sinusoid, that is used to impose a vibrato effect on the pitch-corrected melody and harmony voices. The "Vibrato Depth" parameter controls the amplitude of a modulating control signal that is used to impose a vibrato effect on the pitch-corrected melody and harmony voices.

Other parameters may be available, though not shown. For example, a "File Formats Used" parameter controls certain file handling. For example, reference pitch data may be derived from MIDI files, and stored in a text file-format consisting of triples: onset in units of frames, duration in units of frames, MIDI pitch value. The sample-rate and number of samples per frame are assumed fixed; both are specified when generating the text file from MIDI. A "Parameter Maps" parameter can be used to control effects' parameters at specified times. For example, in a Digital Audio Workstation (DAW), parameter maps can be used to control effects' parameters at specified times. A DAW provides a very convenient environment for specifying these parameter values. Parameter maps can be saved as MIDI files, and be converted to a text-file format analogous to that used for pitch data, thus making the parameter map data available in a context separate from a DAW.

Figure 14:
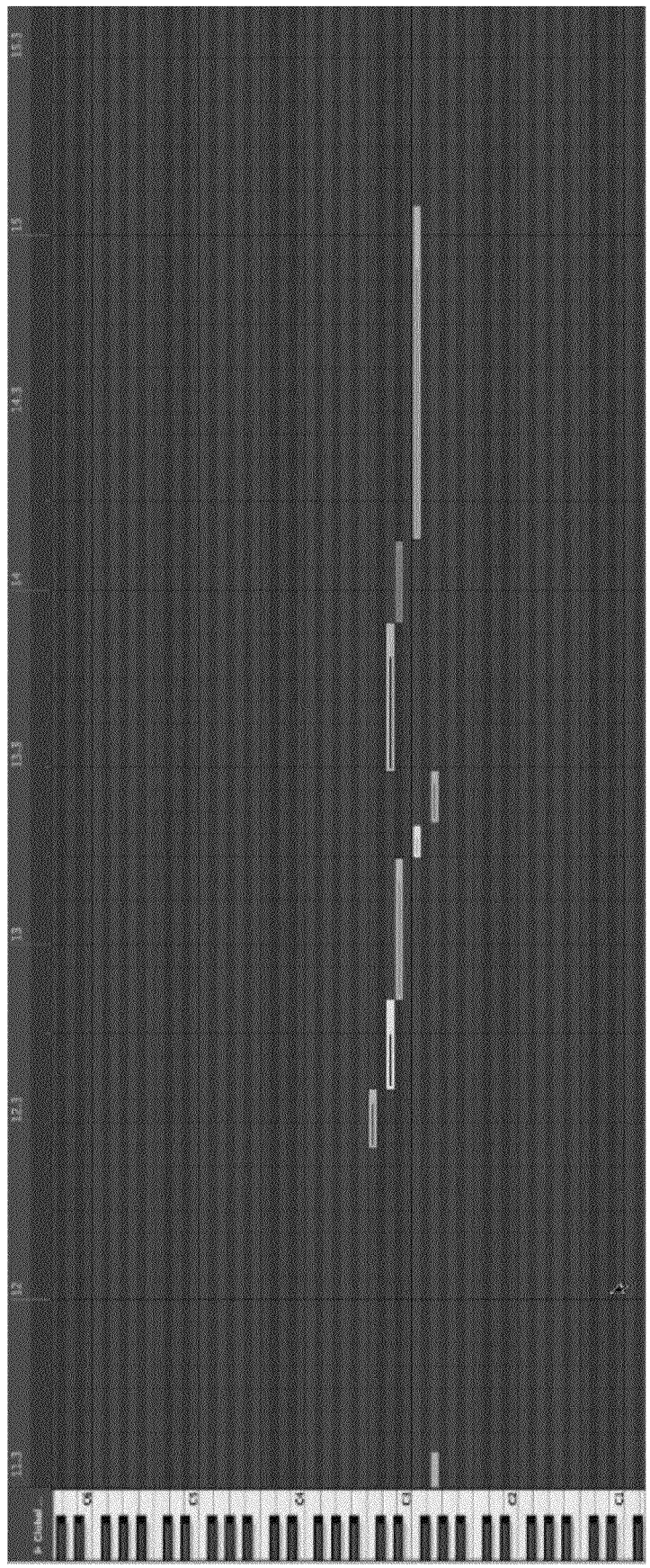
FIG. 14 shows a screenshot of a display provided by a software program that includes a "piano roll" display corresponding to a MIDI file of the reference data.

It will be appreciated that embodiments may include many other types of user interface. For example, FIG. 14 shows a screenshot of a display provided by a software program that includes a "piano roll" display corresponding to a MIDI file of the reference data 225. This MIDI file can be created by the program. The MIDI file provides the reference performance that informs the program how to tune the input performance. That is, the MIDI file illustrated in FIG. 14 may provide the target reference.

Figure 15:
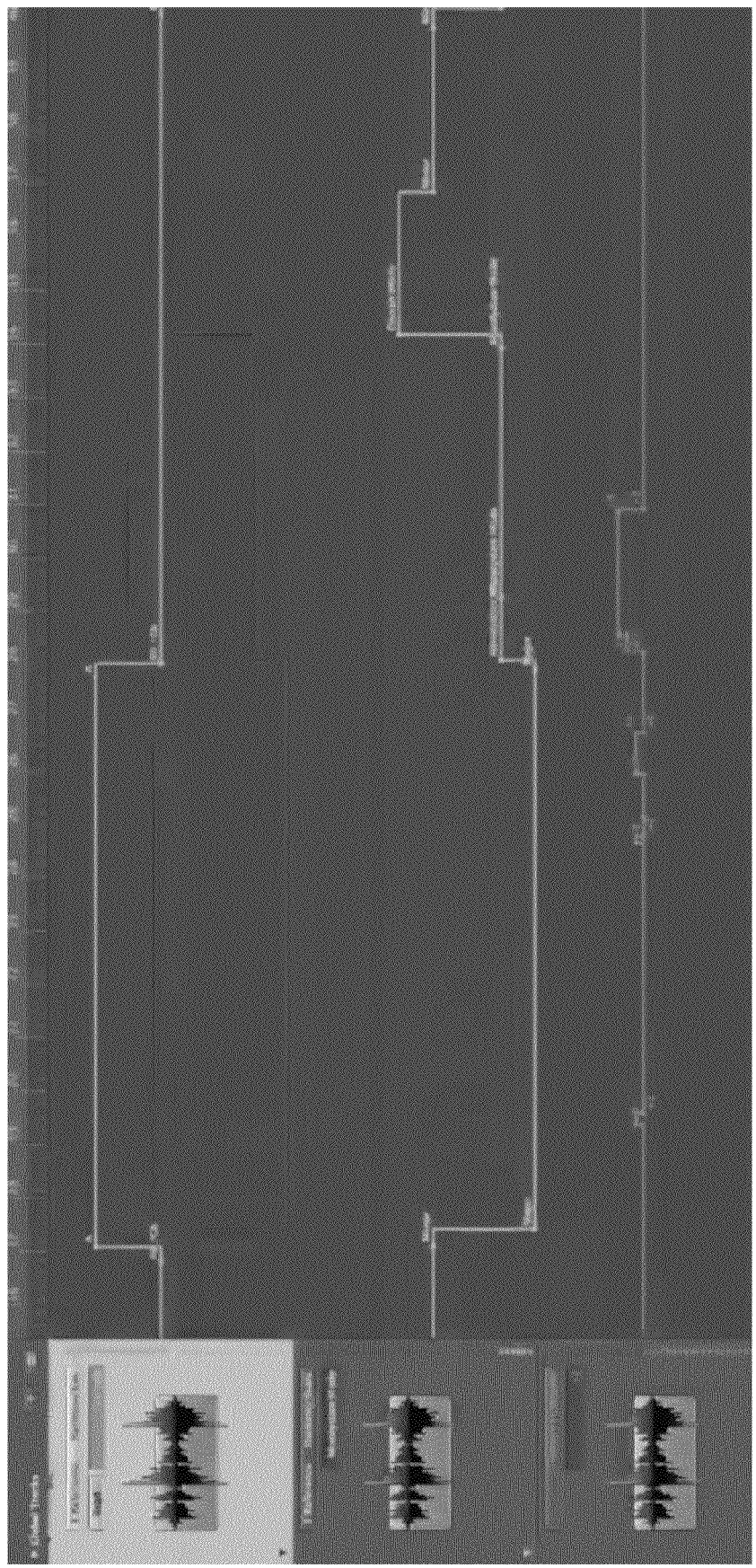
FIG. 15 is a user interface screenshot that shows automation data for informing the program how to harmonize the input performance to recreate the sound of the MIDI reference map input.

FIG. 15 is a user interface screenshot that shows automation data for informing the program how to harmonize the input performance to recreate the sound of the MIDI reference map input. That is, the automation data indicate how the key and scale of the input performance should be adjusted to match the target performance. In this way, all notes and harmonies of the input performance are tuned to the original target reference song. For example, even an input performance that comprises spoken words may be corrected to the correct pitch and temporal values of the reference song.

Figure 16:
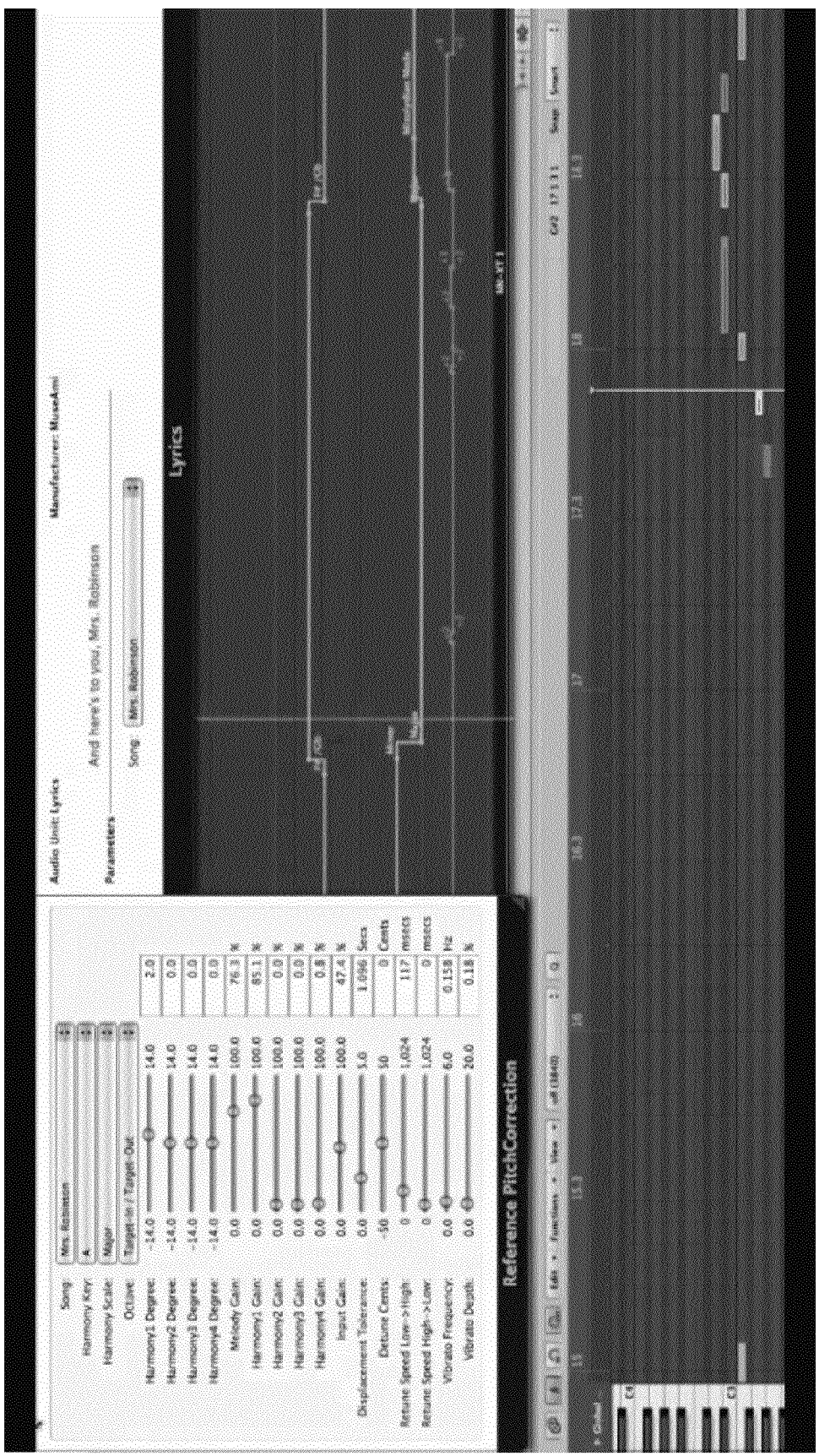
FIG. 16 shows a screenshot illustrating how pitch correction setting windows, like the ones shown in FIGS. 10-13, can be used in conjunction with other interface windows, like the ones shown in FIGS. 14 and 15.

FIG. 16 shows a screenshot illustrating how a pitch correction setting window, like the ones shown in FIGS. 10-13, can be used in conjunction with other interface windows, like the ones shown in FIGS. 14 and 15. Notably, the illustrated screenshot also shows lyrics functionality at the top part of the screenshot.

Figure 17:
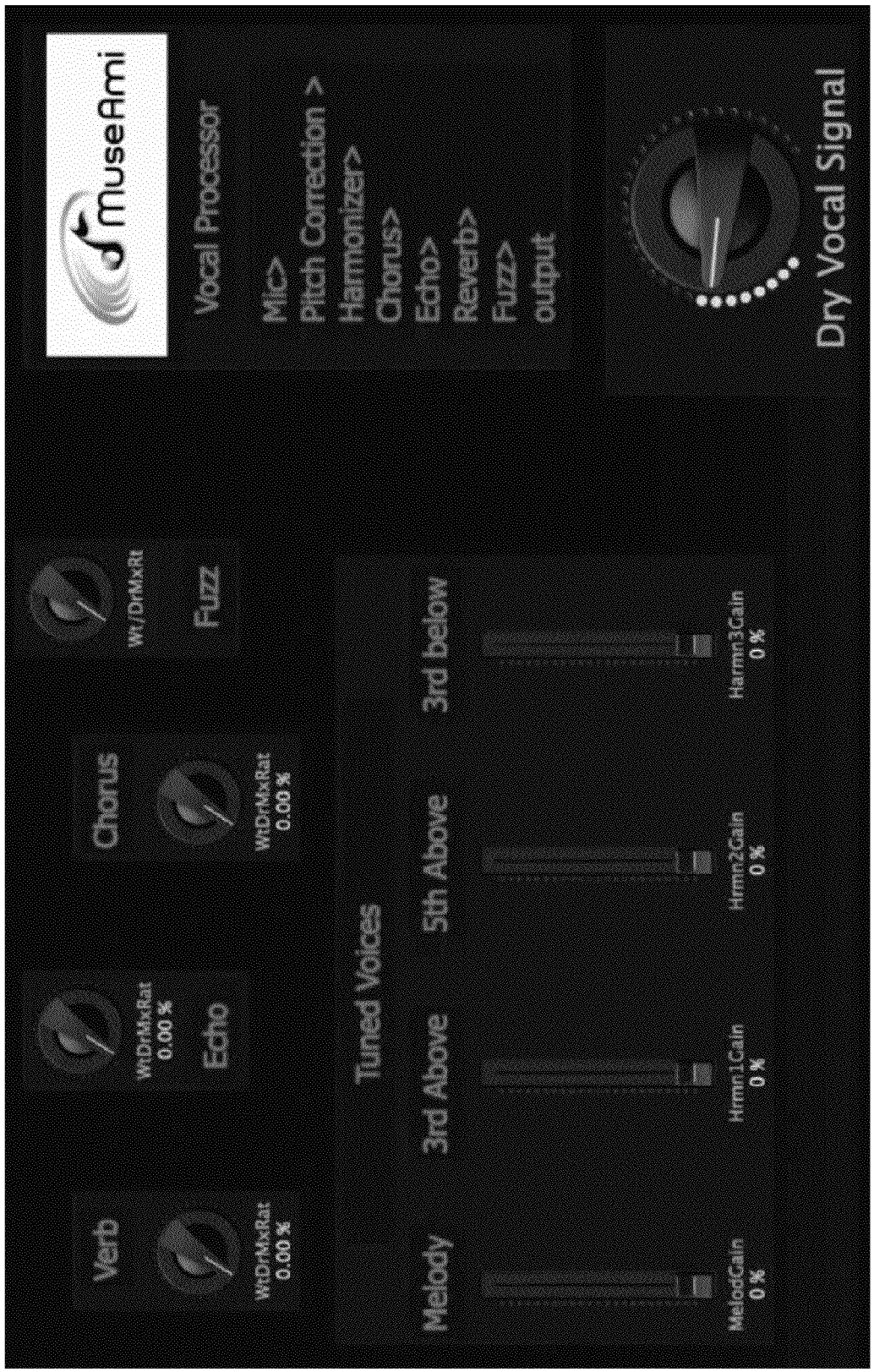
FIG. 17 shows a screenshot of another user interface of an illustrative program, illustrating another implementation of input selection for vocal processing.

FIG. 17 shows a screenshot of another user interface of an illustrative program, illustrating another implementation of input selection for vocal processing. The screenshot shows that gain for three harmony tracks may be adjusted, as well as the melody gain. The gain of the input performance (dry vocal signal) can be adjusted, as well. Other settings can be changed via display rotary knobs to adjust reverberation, echo, chorus, and fuzz effects.

Figure 18:
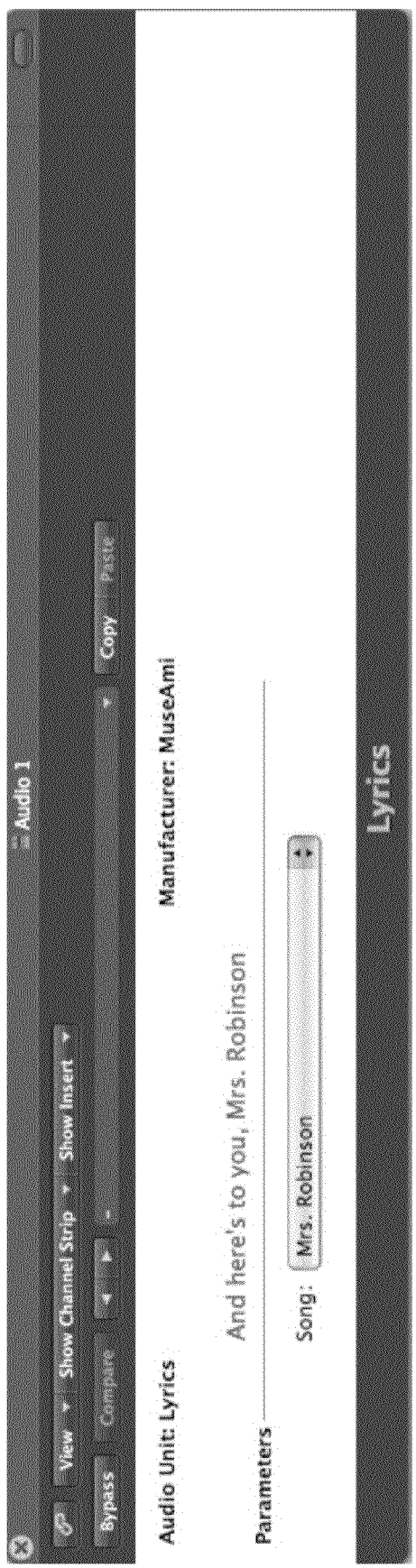
FIG. 18 shows a screenshot of another user interface of an illustrative program, illustrating lyrics functionality.

FIG. 18 shows a screenshot of another user interface of an illustrative program, illustrating lyrics functionality. For example, song lyrics are displayed in synch with a current song, so that the user is prompted with the words that should be sung at the current moment in time. The song parameter may control which lyrics will be displayed, as a song progresses. A simple file-format is used for specifying the time (to millisecond accuracy) that text should be displayed. In some embodiments, during the progression of a song, the current syllable of the lyrics will be identified, either by a color change, bouncing ball, or the like.

Figure 19:
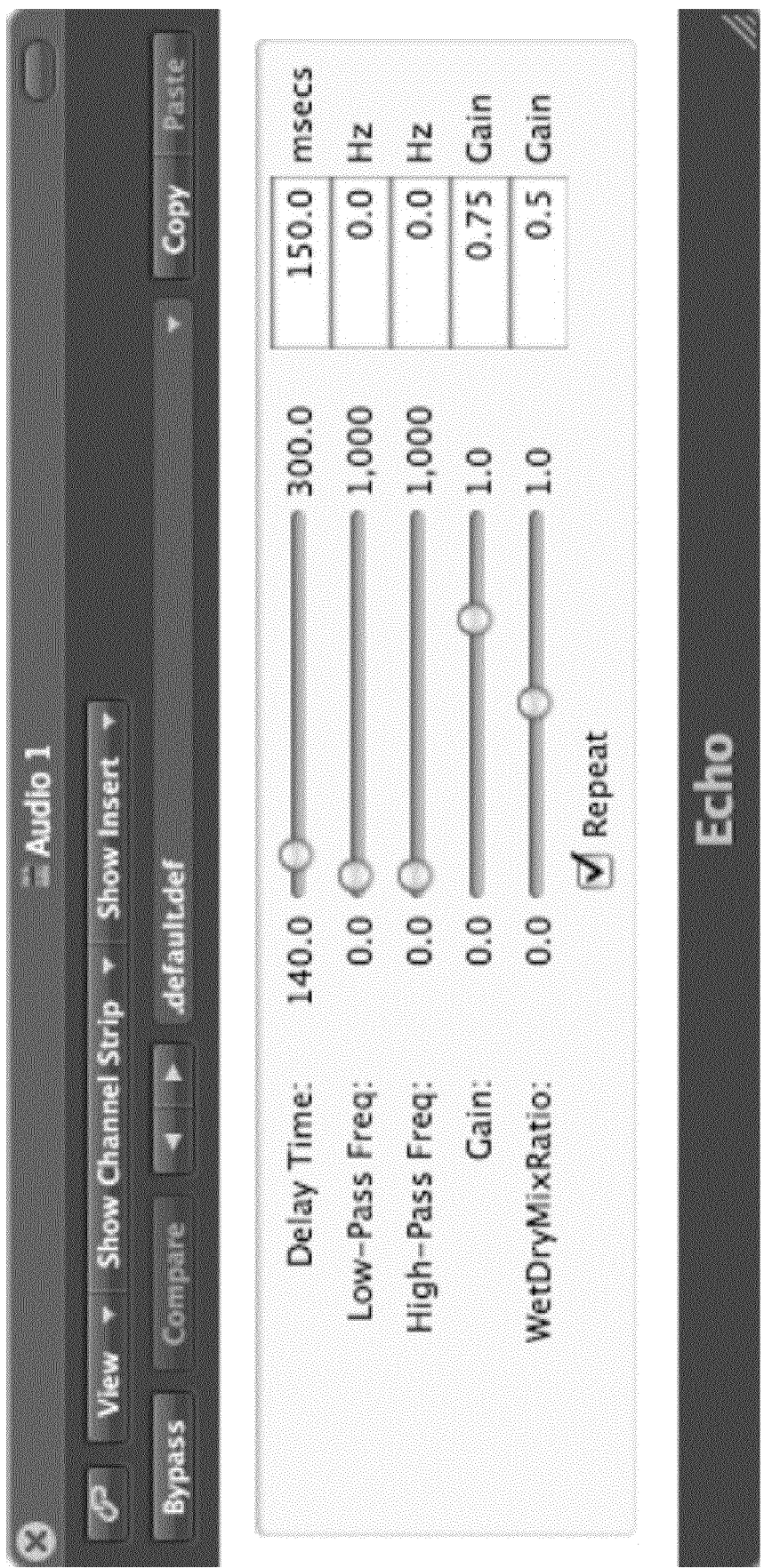
FIG. 19 shows a screenshot of another user interface of an illustrative program, illustrating echo functionality.

FIG. 19 shows a screenshot of another user interface of an illustrative program, illustrating echo functionality. Echo is an audio effect based on a large-delay of the input signal. Other parameters serve to control and enhance this effect. For example, a "delay time" parameter (e.g., in milliseconds) controls the delay imposed on the input signal. A "low-pass freq" parameter controls the corner frequency of a low-pass filter that is applied to the delayed input; the resulting signal is then multiplied by a feedback gain, and accumulated with the original input. A "high-pass freq" parameter controls the corner frequency of a high-pass filter that is applied to the delayed input signal; the resulting signal is then multiplied by a feed-forward gain, and mixed with the input signal to produce the output signal. A "gain" parameter controls the contribution of the filtered signals in the signal flow. A "WetDryMixRatio" parameter controls the wet/dry mix, the proportion of affected and original input combined to produce the output. For example, if the wet/dry mix ratio is "0," only the original input will be output, whereas if the wet/dry mix ratio is "1.0," only the affected input will be output. A "repeat" parameter controls accumulation and/or mixing. If the repeat parameter is active, the delayed input is fed-back and accumulated with the input; otherwise, the delayed input signal is fed-forward for mixing with the input signal. In some embodiments, a tap-button is added to provide user-specification of delay time. Specifically, the time between button presses will be used to set the delay time parameter. This control mechanism may provide an intuitive way of manipulating the echo effect.

Figure 20:
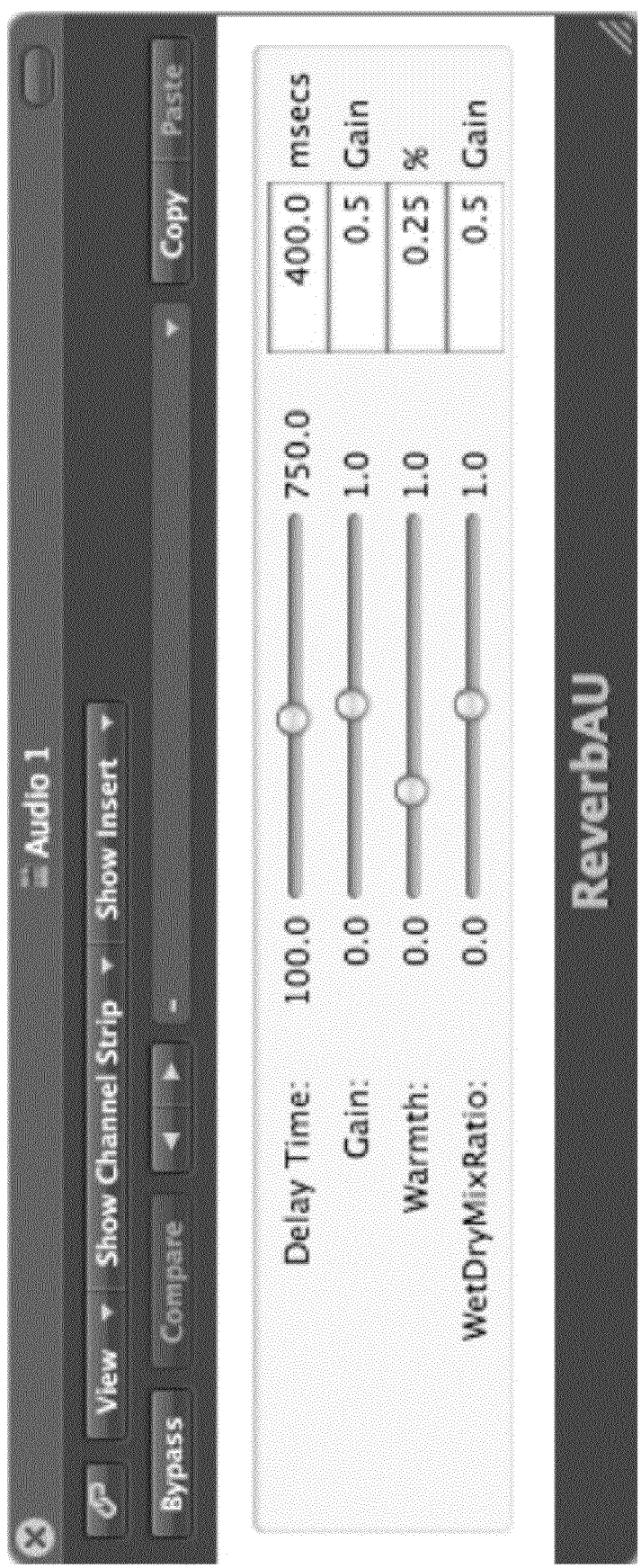
FIG. 20 shows a screenshot of another user interface of an illustrative program, illustrating reverb functionality.

FIG. 20 shows a screenshot of another user interface of an illustrative program, illustrating reverb functionality. Reverb is a delay effect that mimics the reverberation typical of an acoustic space by combining multiple delayed versions of the input. A "delay time" parameter controls the delay of multiple versions of the input signal. A larger delay time may serve to create a sound typical of a larger space. A "gain" parameter affects the contributions of the multiple delayed signals. A "warmth" parameter affects the corner frequency of low-pass filtering applied to multiple delay signals, and intuitively characterizes the sound produced. A "WetDryMixRatio" parameter controls the proportion of affected and original input combined to produce the output. For example, if the wet/dry mix ratio is 0, only the original input will be output, whereas if the wet/dry mix ratio is 1.0, only the affected input will be output.

Figure 21:
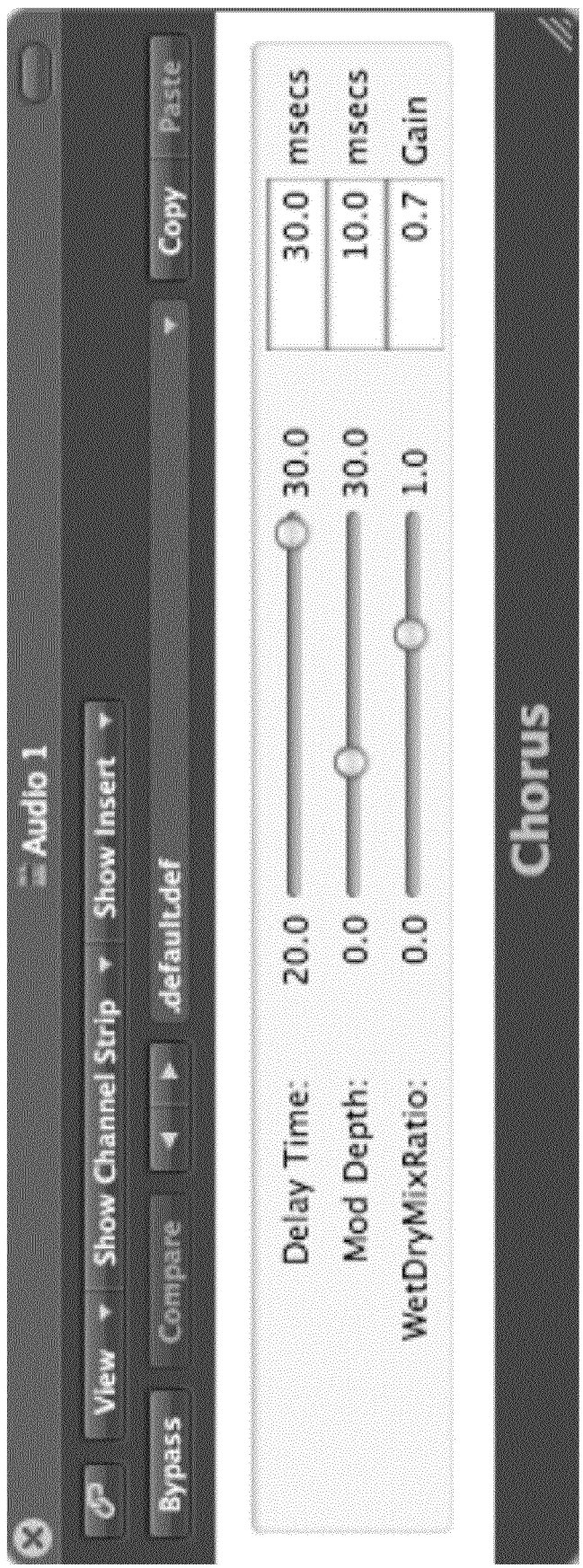
FIG. 21 shows a screenshot of another user interface of an illustrative program, illustrating chorus functionality.

FIG. 21 shows a screenshot of another user interface of an illustrative program, illustrating chorus functionality. The chorus effect aims to create the illusion of multiple input sources sounding together, each contributing individual variation. This is achieved by combining multiple copies of the input, each with a unique delay. A "delay time" parameter controls the base amount of delay imposed on the input; this base delay is varied uniquely for each copy of the input signal. A "mod depth" parameter controls the extent to which input delays are modulated to create the illusion of individual source variation. A "WetDryMixRatio" parameter controls the proportion of affected and original input combined to produce the output. For example, if the wet/dry mix ratio is 0, only the original input will be output, whereas if the wet/dry mix ratio is 1.0, only the effected input will be output.

Figure 22:
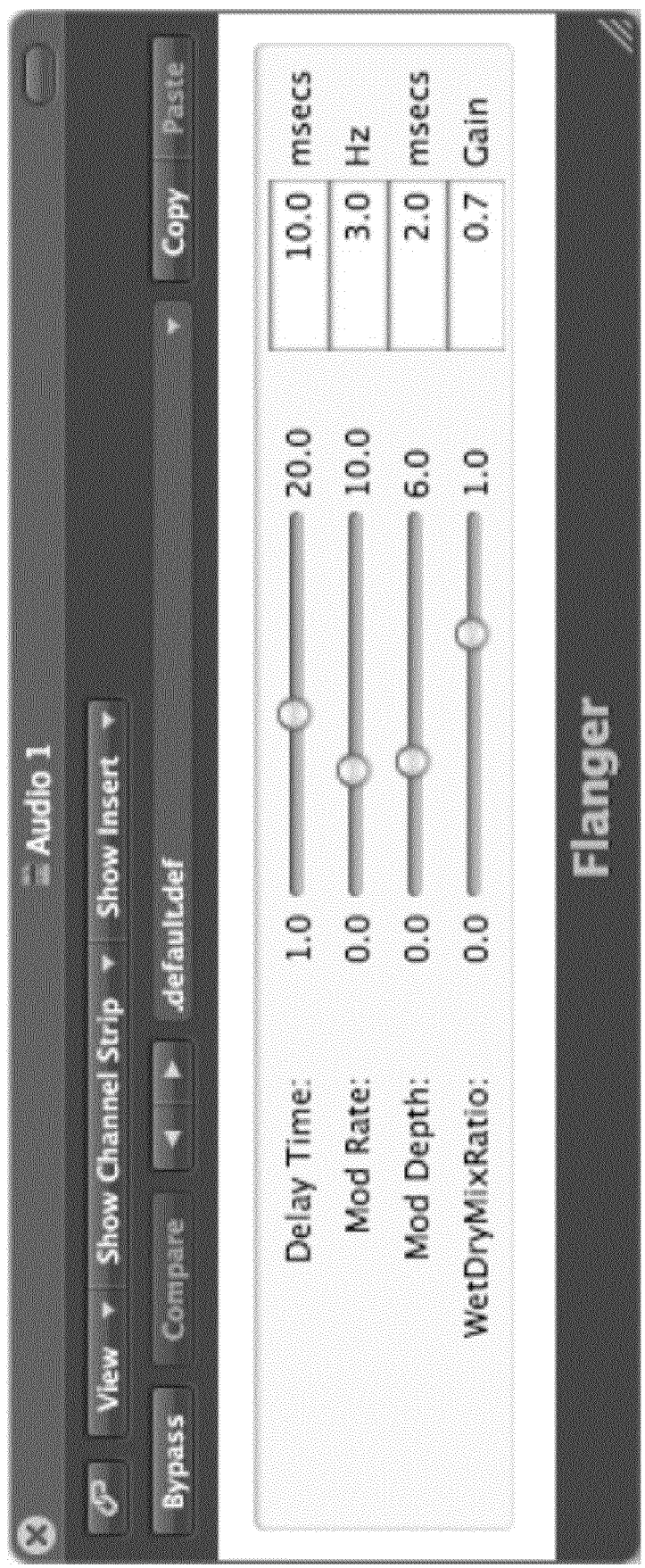
FIG. 22 shows a screenshot of another user interface of an illustrative program, illustrating flanger functionality.

FIG. 22 shows a screenshot of another user interface of an illustrative program, illustrating flanger functionality. The flanger effect is a frequency-sweeping effect that is produced when a copy of the input signal is delayed by a small modulated amount, and then is combined with the original signal. A "delay time" parameter controls a base amount of time by which a copy of the input signal is delayed. This base delay time is then modulated by the Mod Rate and Mod Depth parameters. A "mod rate" parameter controls the speed at which the delay time parameter is varied. A "mod depth" parameter controls the extent (e.g., in milliseconds) by which the delay time parameter is modulated. A "WetDryMixRatio" parameter controls the proportion of affected and original input combined to produce the output. For example, if the wet/dry mix ratio is 0, only the original input will be output, whereas if the wet/dry mix ratio is 1.0, only the affected input will be output.

Figure 23:
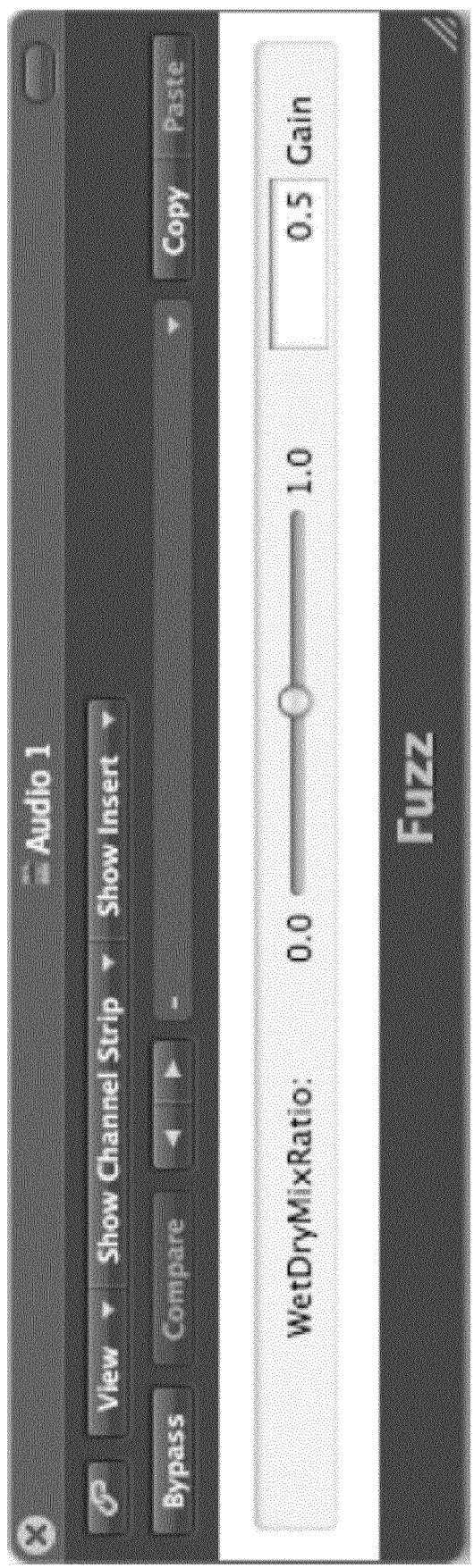
FIG. 23 shows a screenshot of another user interface of an illustrative program, illustrating fuzz functionality.

FIG. 23 shows a screenshot of another user interface of an illustrative program, illustrating fuzz functionality. Fuzz is a distortion effect similar to that achieved by singing through a guitar amp. A "WetDryMixRatio" parameter controls the proportion of affected and original input combined to produce the output. For example, if the wet/dry mix ratio is 0, only the original input will be output, whereas if the wet/dry mix ratio is 1.0, only the affected input will be output. In some embodiments, distortion type and tone, and/or other extensions are provided to the fuzz functionality.

Details have been given in the description above to provide a thorough understanding of the embodiments. It will be understood by one of ordinary skill in the art that the embodiments may be practiced without these specific details. For example, well-known circuits, processes, algorithms, structures, components, and techniques have been shown without unnecessary detail in order to avoid obscuring the embodiments. Further, the headings provided herein are intended merely to aid in the clarity of the descriptions of the various embodiments, and should not be construed as limiting the scope of the invention or the functionality of any part of the invention. For example, certain methods or components may be implemented as part of other methods or components, even though they are described under different headings.

Further, while the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for processing an audio performance, the system comprising:
    an audio processing subsystem configured to:
        calculate a pitch estimate and a current time estimate as a function of an input audio waveform;
        correlate a temporal window to a portion of a reference track stored in a data store, the reference track comprising a plurality of reference notes, each reference note having a reference pitch and a reference note duration, the temporal window having a temporal window size that extends from a first time location prior to the current time estimate to a second time location subsequent to the current time estimate;
        identify a candidate reference note from the plurality of reference notes, such that the candidate reference note has a reference note duration that overlaps at least partially with the temporal window; and
        calculate a pitch score as a function of the pitch estimate and the reference pitch of the candidate reference note; and
    an output processing subsystem, communicatively coupled with the audio processing system, and configured to produce an audiovisual effect according to the pitch score.

2. The system of claim 1, wherein the audio processing subsystem is further configured to:
    generate the temporal window as a function of the temporal window size and the current time estimate.

3. The system of claim 2, wherein the audio processing subsystem is further configured to:
    receive an adjustment to the temporal window size; and
    adjust the temporal window size according to the adjustment prior to generating the temporal window as a function of the temporal window size.

4. The system of claim 3, wherein the adjustment to the temporal window is received according to a user-initiated command or according to a computer-initiated command.

5. The system of claim 3, wherein the audio processing subsystem is further configured to:
    receive the input audio waveform at the audio processing subsystem; and
    receive the temporal window size substantially concurrently with receiving the input audio waveform at the audio processing subsystem.

6. The system of claim 1, wherein the audio processing subsystem is further configured to:
    receive the input audio waveform at the audio processing subsystem; and
    calculate the pitch score substantially concurrently with receiving the input audio waveform.

7. The system of claim 1, wherein:
    the output processing subsystem is configured to produce the audiovisual effect by generating an output audio waveform having a pitch shifted version of at least a portion of the input audio waveform as a function of the pitch score, the pitch score indicating a magnitude of pitch distance between the pitch estimate and the reference pitch of the candidate reference note.

8. The system of claim 1, wherein:
    the audio processing subsystem is further configured to calculate a pitch window around the pitch estimate as a function of a pitch window size;
    calculating the pitch score as a function of the pitch estimate and the reference pitch of the candidate reference note comprises determining whether the reference pitch falls within the pitch window; and
    the output processing subsystem is configured to produce the audiovisual effect by generating an output audio waveform by pitch shifting the input audio waveform as a function of the reference pitch only when the reference pitch falls within the pitch window.

9. The system of claim 8, further comprising:
    a graphical user interface configured to receive an adjustment from a user to the pitch window size,
    wherein the audio processing subsystem is further configured to adjust the pitch window size according to the adjustment prior to calculating the pitch window.

10. The system of claim 9, wherein the graphical user interface is configured to receive the adjustment to the pitch window size substantially in real time while receiving the input audio waveform at the computer system from the acoustic audio source.

11. The system of claim 1, wherein the audio processing subsystem is configured to identify the candidate reference note from the plurality of reference notes by:
    determining that a subset of reference notes each has a reference note duration that overlaps at least partially with the temporal window; and
    determining a winning one of the subset of reference notes as the reference note having a reference pitch that is closer to the pitch estimate than the reference pitches of the others of the subset of reference notes,
    the candidate reference note being the winning one of the subset of reference notes.

12. The system of claim 1, wherein the output processing subsystem is configured to output the audiovisual effect while receiving the input audio waveform at the computer system from the acoustic audio source.

13. A computer-implemented method for processing an audio performance, the method comprising:
    calculating a pitch estimate and a current time estimate as a function of an input audio waveform using a processor of the computer system, the input audio waveform received at a computer system from an acoustic audio source;

correlating a temporal window using the processor to a portion of a reference track stored in a data store of the computer system, the reference track comprising a plurality of reference notes, each reference note having a reference pitch and a reference note duration, the temporal window having a temporal window size that extends from a first time location prior to the current time estimate to a second time location subsequent to the current time estimate;

identifying a candidate reference note from the plurality of reference notes using the processor, such that the candidate reference note has a reference note duration that overlaps at least partially with the temporal window;

calculating a pitch score as a function of the pitch estimate and the reference pitch of the candidate reference note using the processor; and producing an audiovisual effect according to the pitch score.

14. The computer-implemented method of claim 13, further comprising:
generating the temporal window as a function of the temporal window size and the current time estimate.

15. The computer-implemented method of claim 14, further comprising:
receiving an adjustment to the temporal window size; and
adjusting the temporal window size according to the adjustment prior to generating the temporal window as a function of the temporal window size.

16. The computer-implemented method of claim 15, wherein the adjustment to the temporal window is received from a user via a graphical user interface.

17. The computer-implemented method of claim 15, wherein the adjustment to the temporal window is received according to a computer-initiated command.

18. The computer-implemented method of claim 15, further comprising:
receive the input audio waveform at the computer system; and
receive the temporal window size substantially concurrently with receiving the input audio waveform at the computer system.

19. The computer-implemented method of claim 13, further comprising:
receiving the input audio waveform at the computer system,
wherein the calculating the pitch score step occurs substantially concurrently with receiving the input audio waveform at the computer system.

20. The computer-implemented method of claim 13, further comprising:
receiving the input audio waveform at the computer system,
wherein the producing the audiovisual effect step occurs substantially concurrently with receiving the input audio waveform at the computer system.

21. The computer-implemented method of claim 13, further comprising:
generating an output audio waveform by pitch shifting the input audio waveform as a function of the pitch score, the pitch score indicating a magnitude of pitch distance between the pitch estimate and the reference pitch of the candidate reference note,
wherein producing the audiovisual effect comprises outputting the output audio waveform.

22. The computer-implemented method of claim 21, wherein:
outputting the output audio waveform comprises outputting the output audio waveform to at least one of an audio data storage system or an audio playback system.

23. The computer-implemented method of claim 13, further comprising:
calculating a pitch window around the pitch estimate as a function of a pitch window size, wherein:
calculating the pitch score as a function of the pitch estimate and the reference pitch of the candidate reference note comprises determining whether the reference pitch falls within the pitch window; and
producing the audiovisual effect comprises generating an output audio waveform by pitch shifting the input audio waveform as a function of the reference pitch only when the reference pitch falls within the pitch window.

24. The computer-implemented method of claim 23, further comprising:
receiving, from a user at the computer system via a graphical user interface, an adjustment to the pitch window size; and
adjusting the pitch window size according to the adjustment prior to calculating the pitch window.

25. The computer-implemented method of claim 24, further comprising:
receiving the input audio waveform at the computer system,
wherein the adjustment to the pitch window size is received substantially concurrently with receiving the input audio waveform at the computer system.

26. The computer-implemented method of claim 13, wherein correlating the temporal window using the processor to the portion of the reference track comprises:
playing at least a portion of the reference track while receiving the input audio waveform at the computer system from the acoustic audio source; and
maintaining a reference time according to a current playback position of the reference track, such that the reference time corresponds to the current time estimate.

27. The computer-implemented method of claim 13, wherein identifying the candidate reference note from the plurality of reference notes using the processor comprises:
determining that a subset of reference notes each has a reference note duration that overlaps at least partially with the temporal window; and
determining a winning one of the subset of reference notes as the reference note having a reference pitch that is closer to the pitch estimate than the reference pitches of the others of the subset of reference notes,
the candidate reference note being the winning one of the subset of reference notes.

28. The computer-implemented method of claim 13, further comprising:
calculating a note onset estimate as a function of the input audio waveform; and
calculating a rhythm score as a function of the note onset estimate and a reference note onset, the reference note onset being a starting location of the reference note duration of the candidate reference note.

29. The computer-implemented method of claim 28, further comprising:
calculating a note offset estimate as a function of the input audio waveform; and
calculating the rhythm score further as a function of the note offset estimate and a reference note offset, the reference note offset being an ending location of the reference note duration of the candidate reference note.

30. The computer-implemented method of claim 13, further comprising:
calculating a note amplitude estimate as a function of the input audio waveform; and
calculating an energy score as a function of the note amplitude estimate and a reference amplitude, the reference amplitude being an amplitude value associated with the candidate reference note.

31. The computer-implemented method of claim 13, further comprising:
calculating a note clarity estimate as a function of the input audio waveform; and
calculating a clarity score as a function of the note clarity estimate and a reference clarity, the reference clarity corresponding to a timbre associated with the candidate reference note.

32. The computer-implemented method of claim 13, further comprising:
calculating a note vibrato estimate as a function of the input audio waveform; and
calculating a vibrato score as a function of the note vibrato estimate and at least one of a vibrato speed, a vibrato depth, or a vibrato quality.

33. The computer-implemented method of claim 32, wherein at least one of the vibrato speed, the vibrato depth, or the vibrato quality is associated with the candidate reference note.

34. The computer-implemented method of claim 13, wherein outputting the audiovisual effect according to the pitch score comprises:
generating a harmony event as a function of the pitch score.

35. The computer-implemented method of claim 13, wherein:
the input audio waveform is received at the computer system from the acoustic audio source as part of a user's interaction with an educational interface environment; and
producing the audiovisual effect according to the pitch score comprises outputting an educational feedback to the user via the educational interface environment as a function of the pitch score.

36. The computer-implemented method of claim 13, wherein:
the input audio waveform is received at the computer system from the acoustic audio source as part of a user's interaction with a video game environment; and
producing the audiovisual effect according to the pitch score comprises affecting game play for the user during the user's interaction with the video game environment.

37. The computer-implemented method of claim 36, wherein affecting game play for the user during the user's interaction with the video game environment comprises at least one of:
adjusting a user score in the video game environment according to the pitch score;
adjusting a difficulty level of game play in the video game environment according to the pitch score;
adjusting an audiovisual aesthetic element of the video game environment according to the pitch score; or
adjusting an audio playback parameter according to the pitch score.

38. The computer-implemented method of claim 13, wherein calculating the pitch score comprises:

determining a candidate pitch score as a function of a candidate pitch set comprising the pitch estimate and the reference pitch of the candidate reference note;
pitch shifting at least one of the pitch estimate or the reference pitch by an octave multiple to generate an adjusted pitch set;
determining an adjusted pitch score as a function of the adjusted pitch set; and
using the adjusted pitch score as the pitch score when the adjusted pitch score indicates a closer correlation between the pitch estimate and the reference pitch than does the candidate pitch score.

39. The computer-implemented method of claim 13, wherein the acoustic audio source is a microphone.

40. The computer-implemented method of claim 13, wherein the reference track corresponds to a pre-recorded song.

41. The computer-implemented method of claim 13, wherein the input audio waveform comprises a previously stored audio track.

42. The computer-implemented method of claim 13, wherein the reference track corresponds to a set of scale pitches and a rhythm track.

43. A system for processing an audio performance, the system comprising:
an audio processing subsystem configured to:
receive an input audio waveform;
calculate a pitch estimate as a function of the input audio waveform;
receive an adjustment to a pitch window size substantially concurrently with receiving the input audio waveform, the pitch window size defining extents of a pitch window from a first pitch location below a pitch window anchor to a second pitch location above the pitch window anchor;
correlate the pitch window anchor to a reference pitch corresponding to a candidate reference note, the candidate reference note being one of a plurality of reference notes of a reference track;
calculate a pitch score as a function of the pitch estimate and the reference pitch of the candidate reference note; and
an output processing subsystem, communicatively coupled with the audio processing system, and configured to produce an audiovisual effect according to the pitch score and the pitch window.

44. The system of claim 43, wherein the adjustment to the pitch window size is received from a user via a graphical user interface.

45. The system of claim 43, wherein the adjustment to the pitch window size is received according to a computer-initiated command.

46. The system of claim 43, wherein the audio processing subsystem is further configured to:
calculate a current time estimate as a function of the input audio waveform; and
select the candidate reference note as one of the plurality of reference notes of the reference track that temporally corresponds with the current time estimate.

47. The system of claim 46, wherein the audio processing subsystem is configured to select the candidate reference note as one of the plurality of reference notes of the reference track that temporally corresponds with the current time estimate by:
determining that a subset of the plurality of reference notes each occurs within a threshold temporal distance from the current time estimate; and selecting the candidate reference note as one of the subset of the plurality of reference notes having a reference pitch that is closer to the pitch estimate than reference pitches corresponding to the others of the subset of reference notes.

48. The system of claim 43, wherein:
the output processing subsystem is configured to produce the audiovisual effect by generating an output audio waveform by pitch shifting the input audio waveform as a function of the reference pitch only when the reference pitch falls within the pitch window.

49. The system of claim 43, wherein:
the output processing subsystem is configured to produce the audiovisual effect by generating an output audio waveform by pitch shifting the input audio waveform as a function of the reference pitch only when the reference pitch falls outside the pitch window.

50. The system of claim 43, wherein the output processing subsystem is configured to output the audiovisual effect while receiving the input audio waveform.

51. A computer-implemented method for processing an audio performance, the method comprising:
receiving an input audio waveform;
calculating a pitch estimate as a function of the input audio waveform;
receiving an adjustment to a pitch window size substantially concurrently with receiving the input audio waveform, the pitch window size defining extents of a pitch window from a first pitch location below a pitch window anchor to a second pitch location above the pitch window anchor;
correlating the pitch window anchor to a reference pitch corresponding to a candidate reference note, the candidate reference note being one of a plurality of reference notes of a reference track;
calculating a pitch score as a function of the pitch estimate and the reference pitch of the candidate reference note; and
producing an audiovisual effect according to the pitch score and the pitch window.

52. The computer-implemented method of claim 51, wherein the adjustment to the pitch window size is received from a user via a graphical user interface.

53. The computer-implemented method of claim 51, wherein the adjustment to the pitch window size is received according to a computer-initiated command.

54. The computer-implemented method of claim 51, further comprising:
calculating a current time estimate as a function of the input audio waveform; and
selecting the candidate reference note as one of the plurality of reference notes of the reference track that temporally corresponds with the current time estimate.

55. The computer-implemented method of claim 54, selecting the candidate reference note as one of the plurality of reference notes of the reference track that temporally corresponds with the current time estimate comprises:
determining that a subset of the plurality of reference notes each occurs within a threshold temporal distance from the current time estimate; and
selecting the candidate reference note as one of the subset of the plurality of reference notes having a reference pitch that is closer to the pitch estimate than reference pitches corresponding to the others of the subset of reference notes.

56. The computer-implemented method of claim 51, wherein producing the audiovisual effect comprises:
generating an output audio waveform by pitch shifting the input audio waveform as a function of the reference pitch only when the reference pitch falls within the pitch window.

57. The computer-implemented method of claim 51, wherein producing the audiovisual effect comprises:
generating an output audio waveform by pitch shifting the input audio waveform as a function of the reference pitch only when the reference pitch falls outside the pitch window.

58. The computer-implemented method of claim 51, wherein the audiovisual effect is output while receiving the input audio waveform.

* * * * *